US008004711B2

(12) United States Patent
Suzuki et al.

(10) Patent No.: US 8,004,711 B2
(45) Date of Patent: Aug. 23, 2011

(54) PRINTING APPARATUS AND FORMAT EDIT PROGRAM RECORDED IN COMPUTER-READABLE RECORDING MEDIUM

(75) Inventors: Yasunori Suzuki, Nagoya (JP); Tsuneo Okuyama, Mie-ken (JP); Yuji Iida, Chita (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1182 days.

(21) Appl. No.: 11/729,082

(22) Filed: Mar. 28, 2007

(65) Prior Publication Data

US 2007/0231039 A1    Oct. 4, 2007

(30) Foreign Application Priority Data

Mar. 30, 2006 (JP) ................................. 2006-094059

(51) Int. Cl.
  *G06K 15/00* (2006.01)
  *G06F 3/12* (2006.01)
(52) U.S. Cl. .................................. 358/1.16; 358/1.18
(58) Field of Classification Search .................. 358/1.1, 358/1.2, 1.5, 2.1, 3.2, 3.29, 1.12, 1.13, 1.16, 358/1.18; 400/76, 83, 109, 110, 111, 613
See application file for complete search history.

(56) References Cited

U.S. PATENT DOCUMENTS

| | | | | |
|---|---|---|---|---|
| 5,467,433 A * | 11/1995 | Lamprecht et al. | ........... | 358/1.15 |
| 5,533,176 A * | 7/1996 | Best et al. | ................. | 358/1.18 |
| 5,677,999 A | 10/1997 | Hidaka et al. | | |
| 6,109,798 A * | 8/2000 | Nunokawa et al. | ............. | 400/83 |
| 6,916,129 B2 * | 7/2005 | Woodman | ..................... | 400/109 |
| 7,144,168 B2 * | 12/2006 | Woodman | ..................... | 400/109 |
| 7,251,044 B1 * | 7/2007 | Kurashina | ................... | 358/1.11 |
| 2001/0035964 A1 * | 11/2001 | Kurashina | ..................... | 358/1.1 |

FOREIGN PATENT DOCUMENTS

| | | |
|---|---|---|
| CN | 1113330 | 12/1995 |
| CN | 1560802 | 1/2005 |
| EP | 0 656 606 A2 | 6/1995 |
| JP | 5 008491 | 1/1993 |
| JP | 08072321 A | 3/1996 |
| JP | 09245060 A | 9/1997 |
| JP | 09297647 A | 11/1997 |
| JP | 2001-180050 A | 7/2001 |
| JP | 2001-202569 A | 7/2001 |

OTHER PUBLICATIONS

Anonymous, HTML 4.01 Specification, W3C, Online-URL:http://www.w3.org/TR/htm14/Interact/forms.html#adef-tabindex, Dec. 24, 1999, pp. 6-7, paragraph 17.4, pp. 23-24, col. 17.11.1.

* cited by examiner

*Primary Examiner* — Gabriel Garcia
(74) *Attorney, Agent, or Firm* — Day Pitney LLP

(57) ABSTRACT

When a user selects a printing format for use in producing a label and specifies block names of blocks constituting a printing format in an arbitrary order through a n th-block specifying screen (first block specifying screen, second block specifying screen, . . . ), edit sequence table sets a new edit sequence number based on a specifying order of block names. Then, the new edit sequence number is written over current edit sequence number in each block (edit sequence table) and arrangement of each block is updated based on the edit sequence number 401 after overwritten (edit sequence table).

8 Claims, 25 Drawing Sheets

EDIT SEQUENCE TABLE

| | | | | | | |
|---|---|---|---|---|---|---|
| 401 — EDIT SEQUENCE NUMBER | 1 | 2 | 3 | 4 | 5 | 6 |
| 402 — BLOCK NUMBER | 1 | 2 | 3 | 4 | 5 | 6 |
| 403 — BLOCK NAME | SYMBOL | TITLE | COMMENT | RECORDING TIME | RECORDING FORMAT | RECORDING DATE |
| 404 — NEW EDIT SEQUENCE NUMBER | — | — | — | — | — | — |

FIG. 15
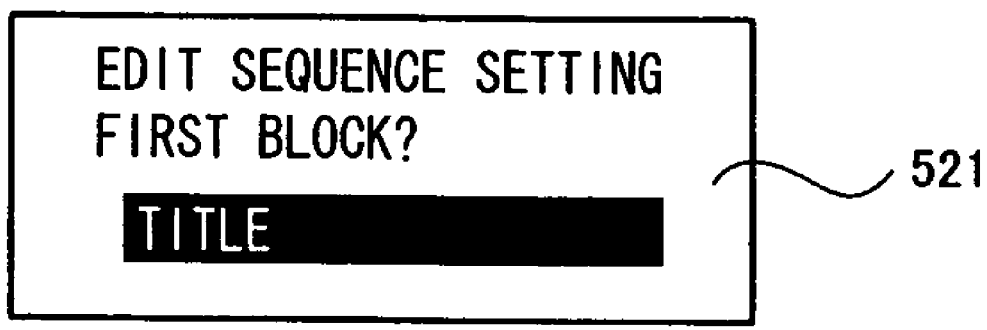
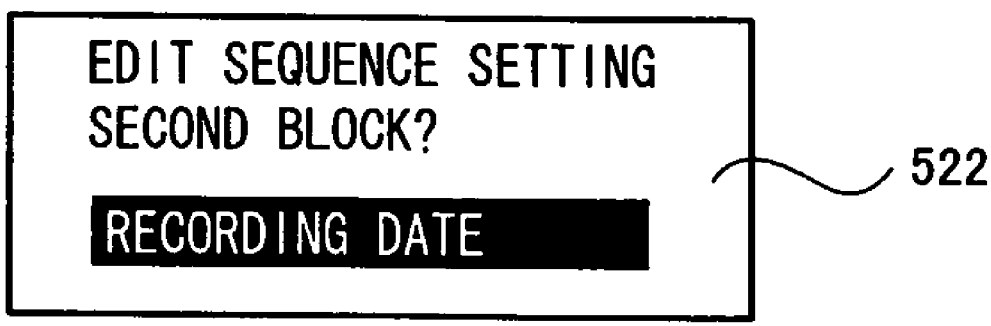

EDIT SEQUENCE TABLE

| 401 | EDIT SEQUENCE NUMBER | 1 | 2 | 3 | 4 | 5 | 6 |
|---|---|---|---|---|---|---|---|
| 402 | BLOCK NUMBER | 1 | 2 | 3 | 4 | 5 | 6 |
| 403 | BLOCK NAME | SYMBOL | TITLE | COMMENT | RECORDING TIME | RECORDING FORMAT | RECORDING DATE |
| 404 | NEW EDIT SEQUENCE NUMBER | 6 | 1 | 3 | 5 | 4 | 2 |

↓

400b

EDIT SEQUENCE TABLE

| 401 | EDIT SEQUENCE NUMBER | 6 | 1 | 3 | 5 | 4 | 2 |
|---|---|---|---|---|---|---|---|
| 402 | BLOCK NUMBER | 1 | 2 | 3 | 4 | 5 | 6 |
| 403 | BLOCK NAME | SYMBOL | TITLE | COMMENT | RECORDING TIME | RECORDING FORMAT | RECORDING DATE |
| 404 | NEW EDIT SEQUENCE NUMBER | 6 | 1 | 3 | 5 | 4 | 2 |

↓

400c

EDIT SEQUENCE TABLE

| 401 | EDIT SEQUENCE NUMBER | 1 | 2 | 3 | 4 | 5 | 6 |
|---|---|---|---|---|---|---|---|
| 402 | BLOCK NUMBER | 2 | 6 | 3 | 5 | 4 | 1 |
| 403 | BLOCK NAME | TITLE | RECORDING DATE | COMMENT | RECORDING FORMAT | RECORDING TIME | SYMBOL |
| 404 | NEW EDIT SEQUENCE NUMBER | 1 | 2 | 3 | 4 | 5 | 6 |

FIG. 18

EDIT SEQUENCE TABLE

| | EDIT SEQUENCE NUMBER | 1 | 2 | 3 | 4 | 5 | 6 |
|---|---|---|---|---|---|---|---|
| 601 | | | | | | | |
| 602 | BLOCK NUMBER | 1 | 2 | 3 | 4 | 5 | 6 |
| 603 | BLOCK NAME | SYMBOL | TITLE | COMMENT | RECORDING TIME | RECORDING FORMAT | RECORDING DATE |
| 604 | EDITED FLAG | 0 | 0 | 0 | 0 | 0 | 0 |

EDIT SEQUENCE TABLE 600a

| | | | | | | |
|---|---|---|---|---|---|---|
| 601 — EDIT SEQUENCE NUMBER | 1 | 2 | 3 | 4 | 5 | 6 |
| 602 — BLOCK NUMBER | 1 | 2 | 3 | 4 | 5 | 6 |
| 603 — BLOCK NAME | SYMBOL | TITLE | COMMENT | RECORDING TIME | RECORDING FORMAT | RECORDING DATE |
| 604 — EDITED FLAG | 1 | 1 | 0 | 0 | 1 | 1 |

EDIT YES LIST 610

| ITEM NUMBER | 1 | 2 | 3 | 4 | 5 | 6 |
|---|---|---|---|---|---|---|
| BLOCK NAME | SYMBOL | TITLE | RECORDING FORMAT | RECORDING DATE | — | — |

EDIT NO LIST 620

| ITEM NUMBER | 1 | 2 | 3 | 4 | 5 | 6 |
|---|---|---|---|---|---|---|
| BLOCK NAME | COMMENT | RECORDING TIME | — | — | — | — |

EDIT SEQUENCE TABLE 600b

| | | | | | | |
|---|---|---|---|---|---|---|
| 601 — EDIT SEQUENCE NUMBER | 1 | 2 | 3 | 4 | 5 | 6 |
| 602 — BLOCK NUMBER | 1 | 2 | 5 | 6 | 3 | 4 |
| 603 — BLOCK NAME | SYMBOL | TITLE | RECORDING FORMAT | RECORDING DATE | COMMENT | RECORDING TIME |
| 604 — EDITED FLAG | 0 | 0 | 0 | 0 | 0 | 0 |

PRINTING APPARATUS AND FORMAT EDIT PROGRAM RECORDED IN COMPUTER-READABLE RECORDING MEDIUM

CROSS-REFERENCE TO RELATED APPLICATIONS

This application claims priority from JP 2006-094059, filed Mar. 30, 2006, the content of which is hereby incorporated by reference.

BACKGROUND

1. Field of the Invention

The disclosure relates to a printing apparatus and a format edit program for printing print data onto a recording object medium and more particularly to an editor for editing a format for inputting data into a data input area specified in each recording object medium.

2. Description of the Related Art

Conventionally, there has been known a tape printing apparatus (tape printer) capable of printing any picture or character strings onto a print tape in which an adhesive printing object sheet that has been coated with adhesive agent on its rear face and a separation sheet are overlapped with each other such that they can be peeled off from each other. In such a tape printer, for example, after a heading or title name is printed onto the printing object sheet, a print tape discharged from a label discharge port is cut into a predetermined length so as to produce a label. Then, the printing object sheet of this label can be peeled from the separation sheet and affixed to an object place such as a back cover of document file or rear side of video tape.

In the conventional tape printer, it has been known that a printing format prepared for each recording medium or label-affixing object is stored in the tape printer and a user produces a label based on the printing format. Generally, in the printing format for producing the label, a plurality of blocks are arranged depending on a recording object medium and the like and a user can input any picture or character string into a data input area constituted of these plural blocks. By inputting data into each block in an interactive way following a predetermined edit sequence, the user can produce a label easily and rapidly.

The label production procedure for the conventional tape printer will now be described.

A printing format 900 shown in FIG. 23 is used for producing a VHS videotape label used in the conventional tape printer and constituted of six blocks 901-906. More specifically, the block 901 is data area for entry of a symbol, the block 902 is data area for entry of a title, the block 903 is data area for entry of a comment, the block 904 is data area for entry of a recording time, the block 905 is data area for entry of a recording format and the block 906 is data area for entry of a recording date.

In this printing format 900, edit sequence for the respective blocks 901-906 is fixed preliminarily and a user inputs data following this edit sequence. As shown in FIG. 24, a screen 911 for entry of a symbol, a screen 912 for entry of a title, a screen 913 for entry of a comment, a screen 914 for entry of a recording time, a screen 915 for entry of a recording format and a screen 916 for entry of a recording date are displayed successively on a display portion of the tape printer and the screens are displayed in turn according to user's operation. If a user inputs any data into the respective screens 911-916 in the interactive way, the data input to the respective screens 911-916 are set to the respective blocks 901-906 of the printing format 900.

In the tape printer, after an image is printed onto a tape based on the printing format 900 after data is input, the tape is cut to a predetermined length so as to produce a label 920. As shown in FIG. 25, an image based on the printing format 900 is printed on the printed label 920, so that data input through the screens 911-916 are respectively printed at positions and sizes corresponding to arrangement and structure of the blocks 901-906. Consequently, a user can easily produce a VHS videotape label on which a desired data is printed.

Conventionally, a variety of arts for changing a printing format have been proposed. For example, a memory area in a RAM is provided with a print sequence table constituted of plural print blocks in which print sequence is fixed and each print column is supplied with an index number so that the index number is selectively written into a format setting column in the print block so as to set up a printing format. A printing format-setting unit for a printer has been known that enables a format constituted of plural print columns to be changed easily through, for example, Japanese Patent Application Laid-Open No. HEI 5-8491.

SUMMARY

The plural blocks constituting the aforementioned printing format do not always have a uniform importance of requiring data input or data update and that importance differs depending on the contents of each block. For example, in the label 920 for the VHS video tape shown in FIG. 25, while generally the title, comment and recording date are important information for distinguishing the video tapes, the recording time and recording format are additional information and therefore, may be omitted. Further, regarding the symbol, it does not need to be updated each time because the same image may be used corresponding to a purpose such as for baseball recording or movie recording. According to these circumstances, the printing format 900 shown in FIG. 23 can be classified into the blocks 902, 903, and 906 having high importance in which data input or data update by a user are required and the blocks 901, 904, 905 having low importance.

From the view point of convenience for a user and prevention of input error, it is preferable to display the screens 912, 913, and 916 at the head of edit sequence so that the blocks 902, 903, and 906 having high importance can be input with preference at the time of data input operation. Further, if the screens 911, 914, and 915 are displayed at the end of the edit sequence in order to omit input of the blocks 901, 904, and 905 having the low importance, the data input screen for the blocks having lower importance can be skipped effectively.

The importance of each block constituting the printing format also differs depending on purposes and preferences of a user. For example, concerning the data input procedure into the printing format 900 shown in FIG. 24, although the user has input a symbol (screen 911), a title (screen 912), a recording format (screen 915), and a recording date (screen 916), the user has not input comments (screen 913) and recording time (screen 914). In this way, the block in which data is to be input differs depending on purposes and preferences of a user among labels for the VHS video tapes of the same format. In other words, because the importance of each block varies depending on individual users, it is preferable that data can be input into each block according to an edit sequence that suits each user.

However, in the conventional tape printer, when a user produces a label using the printing format, the user cannot change the edit sequence of each block according to the importance because the edit sequence of the plural blocks constituting the printing format is fixed. Thus, if a label is produced using the printing format in which the block edit sequence is fixed, errors in data input likely occur thereby deteriorating operation efficiency, which is a problem to be solved. Further, in the invention described in the Japanese Patent Application Laid-Open No. HEI 5-8491 can change arrangement of plural print blocks (print sequence) in a label arbitrarily. However, the printer described in the Japanese Patent Application Laid-Open No. HEI 5-8491 does not solve the above-described problem because it is impossible to change only the edit sequence of each block (that is, data input sequence by user) without changing the arrangement or structure of the blocks in the printing format.

The disclosure has been achieved to solve the above-described problem and an object is to provide a printing apparatus and a format edit program recorded in a computer-readable recording medium in which when print data is produced using a printing format constituted of plural blocks, data can be input to a data input area on the printing format in a preferable edit sequence to user thereby blocking errors in data input and improving operation efficiency.

To achieve the above object, according to a first aspect, there is provided a printing apparatus comprising: a format memory device that stores plural formats constituted of plural blocks for forming a data input area specified for each recording object medium and defining an edit sequence of the plural blocks so as to input data into the data input area; a format selecting device that selects any one format from the plural formats stored in the format memory device; a block edit sequence changing device that changes the edit sequence of the plural blocks defined by the format for the format selected by the format selecting device; and a printing device that prints print data produced based on the selected format on the recording object medium.

According to a second aspect, there is provided a format edit program recorded in a computer-readable recording medium, the format edit program comprising: a format selection step of selecting any one format from among formats stored preliminarily, the formats being constituted of plural blocks for forming a data input area specified for each recording object medium and defining an edit sequence of the plural blocks so as to input data into the data input area; a block edit sequence changing step of changing the edit sequence of the plural blocks defined by the format for the format selected in the format selection step; and a printing step of printing a print data produced based on the format on the recording object medium.

BRIEF DESCRIPTION OF THE DRAWINGS

Exemplary embodiments will be described below in detail with reference to the accompanying drawings in which:

FIG. 15 is a transition diagram of a screen displayed on the liquid crystal display portion in the edit sequence setting processing;

FIG. 16 is a transition diagram of data structure of edit sequence table in the edit sequence setting processing;

FIG. 18 is a diagram showing data structure of the edit sequence table;

FIG. 21 is a transition diagram of data structure of the edit sequence table in the edit sequence setting processing;

DETAILED DESCRIPTION OF EXEMPLARY EMBODIMENTS

The first embodiment will now be described with reference to the accompanying drawings. First, the entire structure of the tape printing apparatus 1 will be described.

Figure 1:
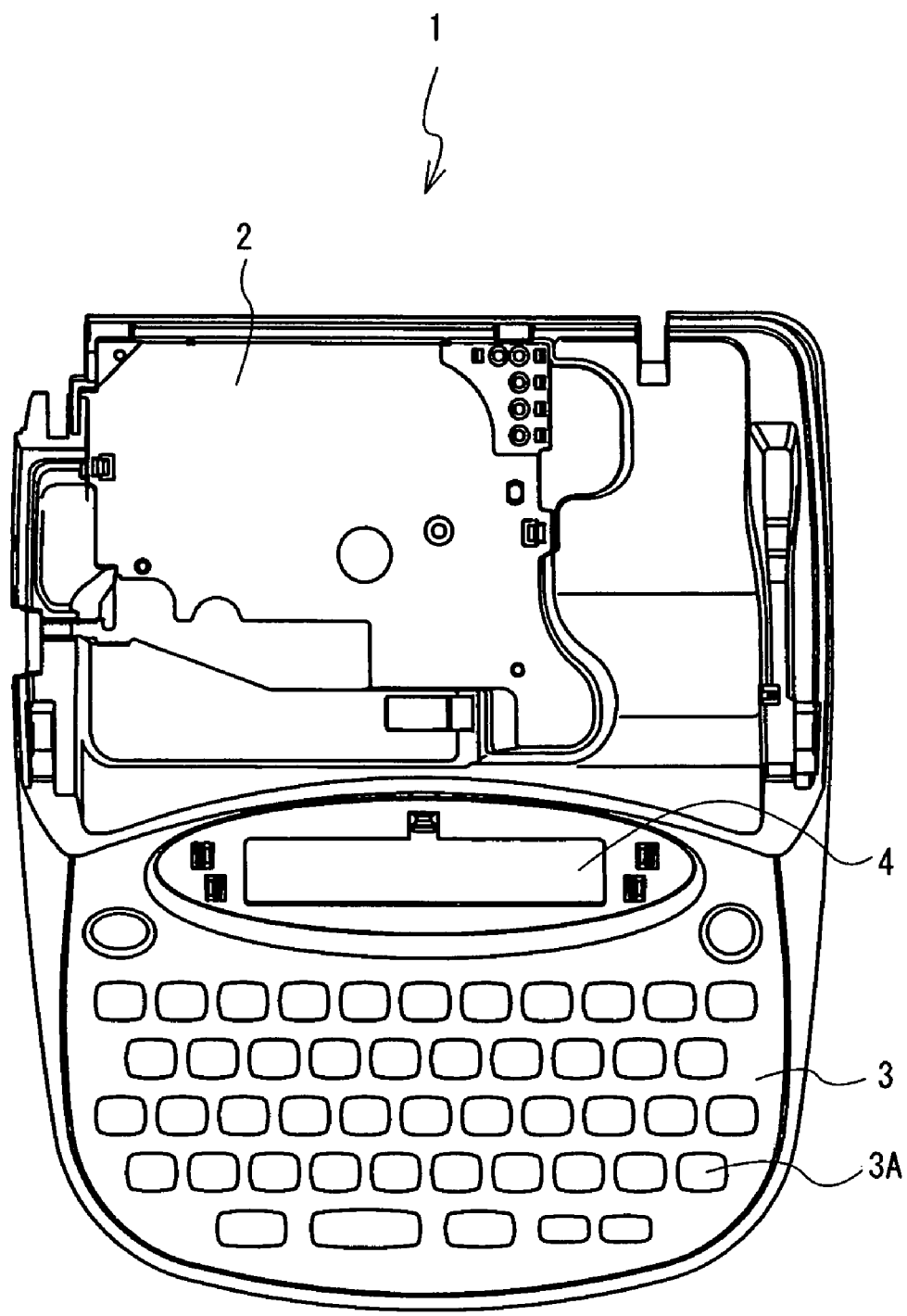
FIG. 1 is a plan view showing a state in which a lid of a tape-accommodating portion of a tape printing apparatus has been removed.

As shown in FIG. 1, a tape cassette accommodating portion 2, which is a concave portion for accommodating a tape cassette 51 (see FIG. 2) described later is provided at the rear portion of the tape printing apparatus 1. Further, a keyboard portion 3 for inputting characters or symbols is provided at the front portion of the tape printing apparatus 1. A plurality of keys 3A for inputting characters, symbols and function commands are arranged on the keyboard portion 3. A liquid crystal display portion 4 is provided between the tape cassette accommodating portion 2 and the keyboard portion 3, so that, characters, symbols and the like input by means of the keyboard 3 can be displayed.

Next, the structure of the tape cassette 51 to be loaded on the tape cassette-accommodating portion 2 of the tape printing apparatus 1 will be described.

Figure 2:
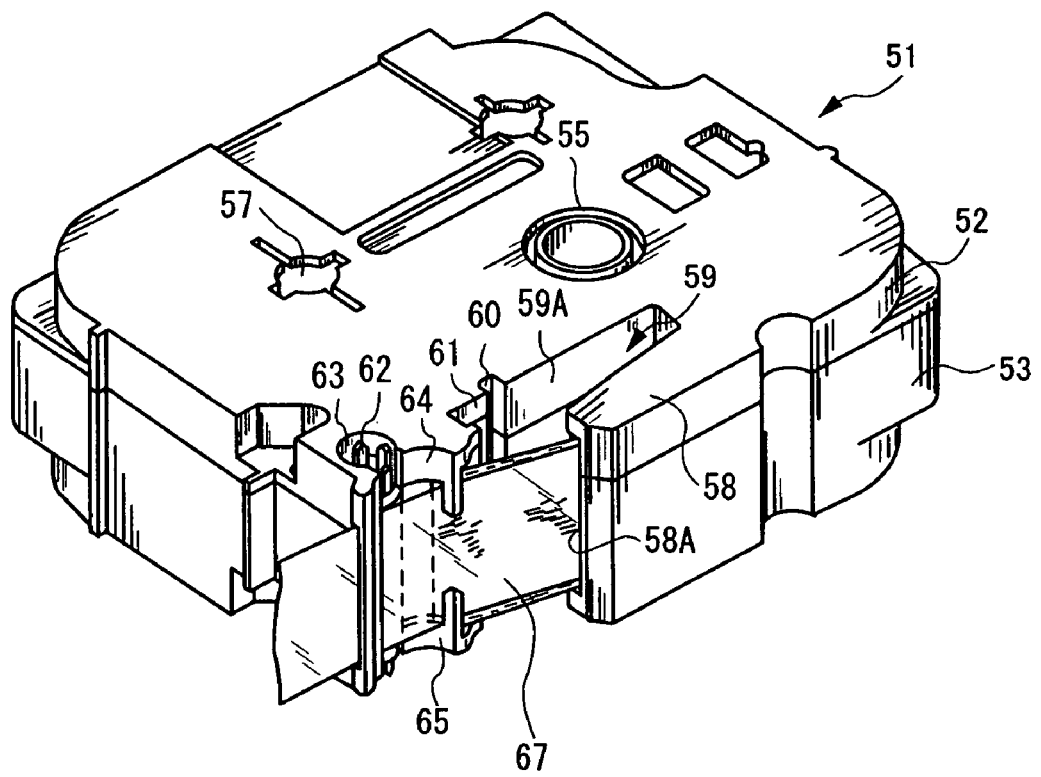
FIG. 2 is a perspective view of a tape cassette.
Figure 3:
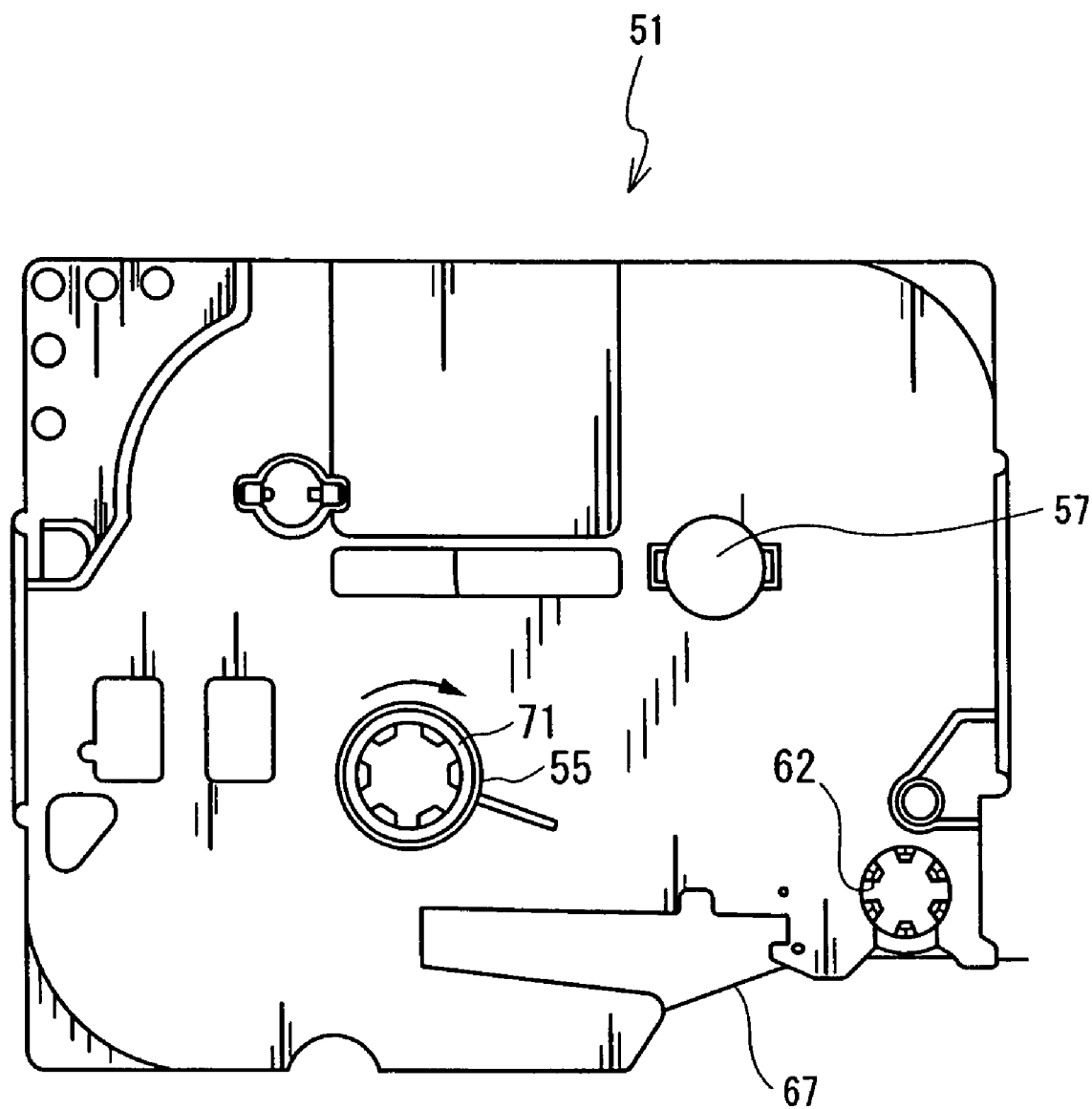
FIG. 3 is a bottom view of the tape cassette.
Figure 4:
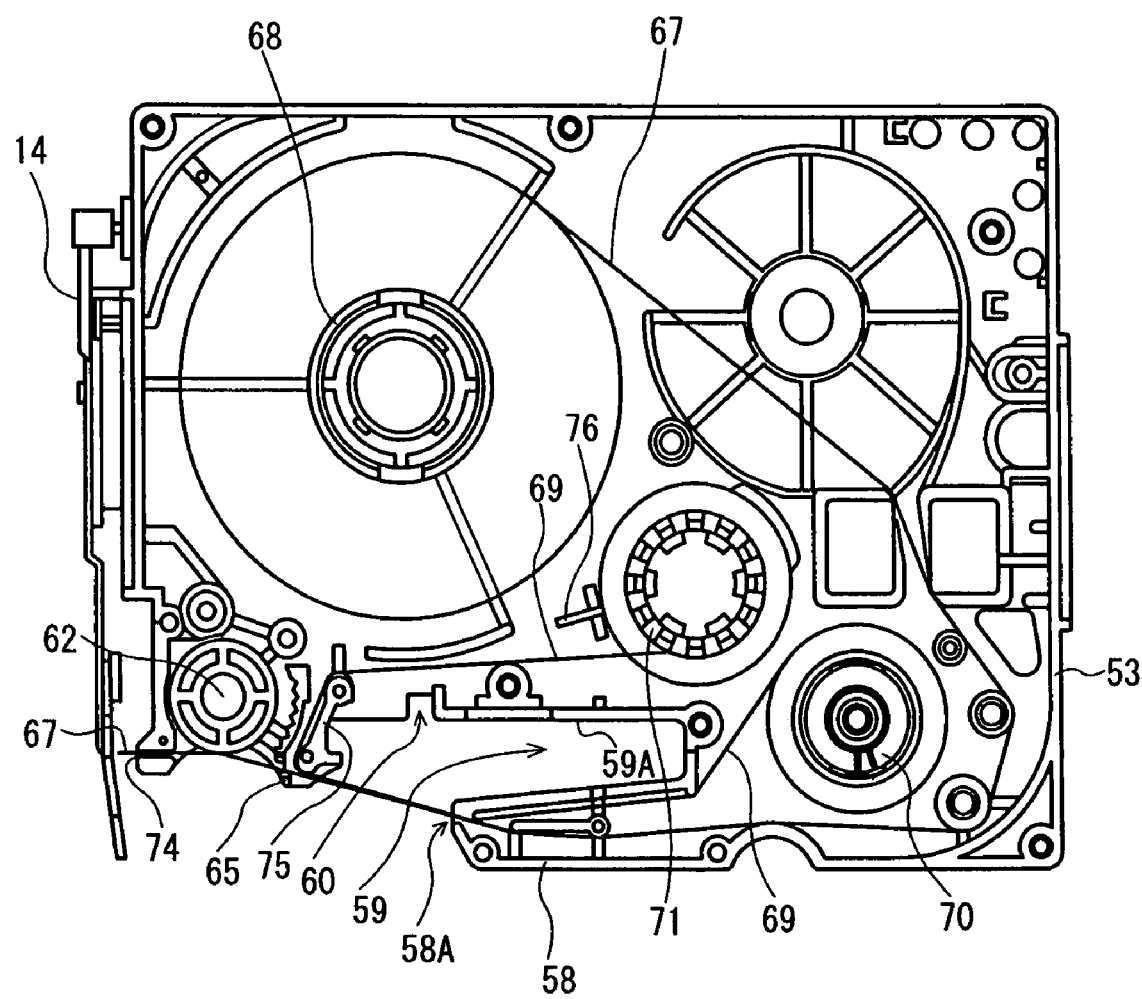
FIG. 4 is a plan view of a lower case in a state in which an upper case has been removed.

As shown in FIGS. 2-4, the tape cassette 51 comprises an upper case 52 and a lower case 53. A supporting hole 57, which supports in a rotatable manner a tape spool 68 around which separation paper of a print tape 67 described later is wound facing outward rotatably is formed in the tape cassette 51. A supporting hole 55, which supports a ribbon winding spool 71 which pulls out an ink ribbon 69 from a ribbon spool 70 and winds up the ink ribbon when characters and the like are printed onto the print tape 67 with a thermal head (not shown) is formed in the tape cassette 51. In the lower case 53, supporting holes 55 and 57 are formed opposite to the respective supporting holes 55, 57 formed in the upper case 52. It should be noted that the print tape 67 is a long tape comprised of a printing medium on which characters and the like are printed, an adhesive agent layer provided on the rear face of the printing medium and a separation layer covering the adhesive agent layer.

An arm portion 58, which guides the print tape 67 pulled out from the tape spool 68 and the ink ribbon 69 pulled out from the ribbon spool 70, and sends it out from an opening 58A is provided on the front side (lower side in FIG. 2) of the tape cassette 51. A head-loading portion 59 on which the thermal head of the tape printing apparatus 1 is to be loaded is provided in the back of the arm portion 58.

A first fitting portion 60, which is dented backward of the tape cassette 51 is formed in a wall portion 59A opposite to the arm portion 58 in the head loading portion 59. A second fitting portion 61, which is dented in a direction perpendicular to the first fitting portion 60 (a direction along the wall portion 59A) is formed in a left side wall of the head loading portion 59. These first fitting portion 60 and second fitting portion 61 are fitted to each of two projecting portions formed on a head holder (not shown) for supporting the thermal head so as to execute loading of the thermal head to the head loading portion 59 without interfering with the respective ink ribbon 69 and the print tape 67.

A tape feed roller 62 is supported rotatably in a supporting hole 63 in the downstream side of the head loading portion 59 in a running direction of each ink ribbon 69 and print tape 67. The tape feed roller 62 pulls out the print tape 67 from the tape spool 68 in cooperation with a press-fit roller (not shown), which is brought into a pressure contact with the tape feed roller 62 from a side opposite thereto. A pair of restricting members 64 and 65, upper and lower ones, are provided at a position near the tape feed roller 62. These restricting members 64 and 65 guides restrictively the print tape 67 on which characters or the like are printed in the width direction on the downstream side of the thermal head.

Next, an internal structure of the tape cassette 51 will be described. As shown in FIG. 4, within the tape cassette 51, the tape spool 68 around which the print tape 67 is wound is disposed rotatably through the supporting hole 57 in the rear portion of the lower case 53 (upper portion in FIG. 4). The ribbon spool 70 around which the ink ribbon 69 is wound is disposed rotatably in the front portion of the lower case 53 (lower portion in FIG. 4). Further, a ribbon winding spool 71 for winding up the ink ribbon 69 consumed for printing characters or the like at the same time of pulling the ink ribbon 69 from the ribbon spool 70 is disposed rotatably through the supporting hole 55 between the tape spool 68 and the ribbon spool 70.

The print tape 67 is pulled out from the tape spool 68 in cooperation with the tape feed roller 62 and the press-fit roller (provided on the side of the tape printing apparatus 1, not shown) as described above. After the print tape 67 has passed the front portion of the head-loading portion 59 (lower side in FIG. 4) through the opening 58A in the arm portion 58, it is discharged out of the tape cassette 51 from the tape discharge portion 74.

A cutter mechanism 14 for cutting the print tape 67 discharged out of the tape discharge portion 74 is disposed sideway of a cassette loading portion 9. The cutter mechanism 14 has a movable blade (not shown), which is rotatable so as to contact and leave a fixed blade (not shown). When, the movable blade is rotated by being driven by a cutter drive circuit 110 (see FIG. 5) so as to cut the print tape 67 discharged out of the tape discharge portion 74 with the fixed blade under the principle of scissors.

The ink ribbon 69 is pulled out of the ribbon spool 70 through the ribbon-winding spool 71 and passes the front portion (lower side in FIG. 4) of the head-loading portion 59 from the opening 58A in the arm portion 58. After the ink ribbon 69 has passed, the ink ribbon 69 is guided by a guide portion 75 formed inside of the respective restricting members 64 and 65 and wound up around the ribbon-winding spool 71. A clutch spring 76 is provided on the bottom portion of the ribbon-winding spool 71 so as to prevent the ink ribbon 69 from loosening when it is wound up by a reverse rotation of the ribbon-winding spool 71.

Next, an electrical structure of the tape printing apparatus 1 will be described.

Figure 5:
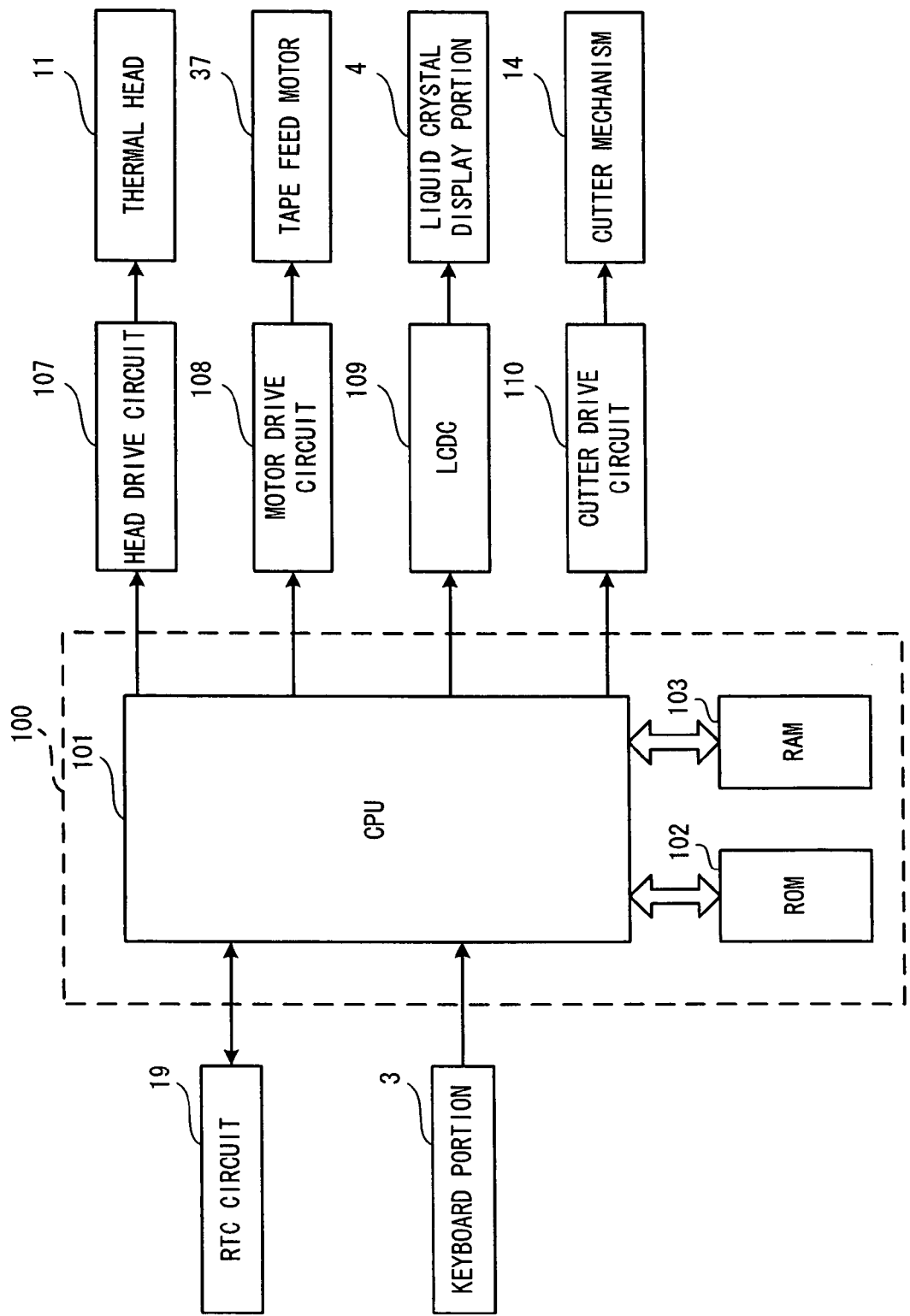
FIG. 5 is a block diagram showing control configuration of the tape printing apparatus.

As shown in FIG. 5, the tape printing apparatus 1 includes a control portion 100 comprising a CPU 101, a ROM 102, and a RAM 103. The keyboard portion 3, a real time clock (RTC) circuit 19, a head drive circuit 107, a motor drive circuit 108, a display controller (hereinafter referred to as LCDC) 109 and the cutter drive circuit 110 are connected to the CPU 101. The RTC circuit 19 is an oscillation circuit for measuring time. The head drive circuit 107 drives the thermal head 11. The motor drive circuit 108 drives a tape feed motor 37. The LCDC 109 has a video RAM for outputting display data to the liquid crystal display portion 4. The cutter drive circuit 110 drives the cutter mechanism 14.

Figure 6:
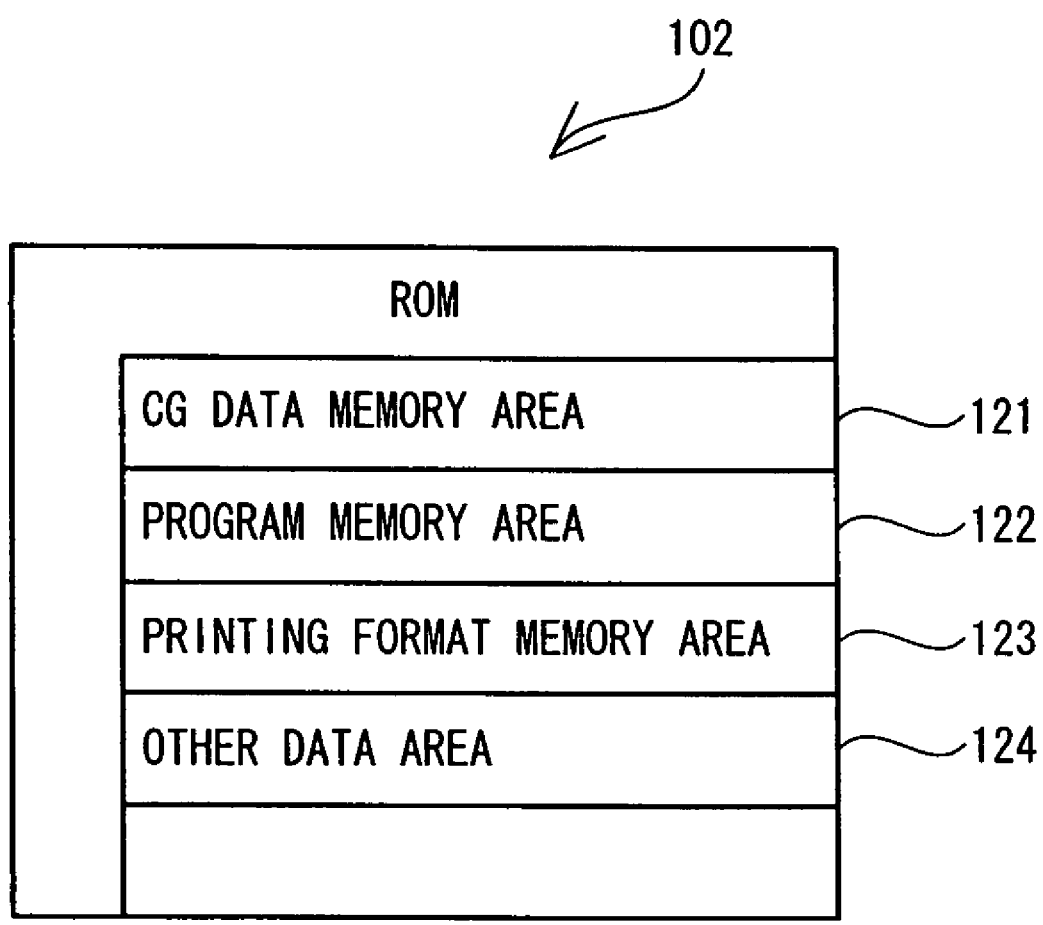
FIG. 6 is a schematic diagram showing the configuration of a ROM.

As shown in FIG. 6, the ROM 102 includes a CG data memory area 121, a program memory area 122, a printing format memory area 123 and an other data area 124. In the CG data memory area 121, in respect to each of a variety of characters for printing alphabetical letters, symbols and the like, a print dot pattern data is classified by each font (Gothic font, Mincho style font and the like) and each font is stored corresponding to a print character size, 6 types for each font (16, 24, 32, 48, 67, and 96) and a code data. Further, a graphic pattern data for printing graphic image is also stored.

The program memory area 122 stores character code data, display drive control program, print drive control program and various programs necessary for control of the tape printing apparatus 1. In the meantime, the code data of the character indicates characters, numerals and the like input by means of the keyboard portion 3. The display drive control program controls the LCDC 109 corresponding to the display data and the like of a selected printing format. The print drive control program reads out data from a print buffer 132 (see FIG. 8) and drives the thermal head 11 and a tape feed motor 37. Then, the CPU 101 executes a variety of arithmetic operations based on various programs stored in the ROM 102. Main control program for executing main processing (see FIG. 10) described later is also stored in the program memory area 122.

A plurality of printing formats that is prepared beforehand for each recording object medium or for each label affixing object product are stored in the printing format memory area 123. Each printing format is composed of plural blocks that form a data input area. Each printing format has its own inherent size and shape and includes its own inherent structure and arrangement composed of the plural blocks. In this embodiment, printing formats for "VHS video (registered trademark)", "8 mm video", "MiniDV (registered trademark)", "FD/MD (registered trademark)", "SD memory card (registered trademark)", "memory stick (registered trademark)", "smart media (registered trademark)", "compact flash (registered trademark)", and "music cassette" are stored beforehand (see FIG. 13).

Figure 7:
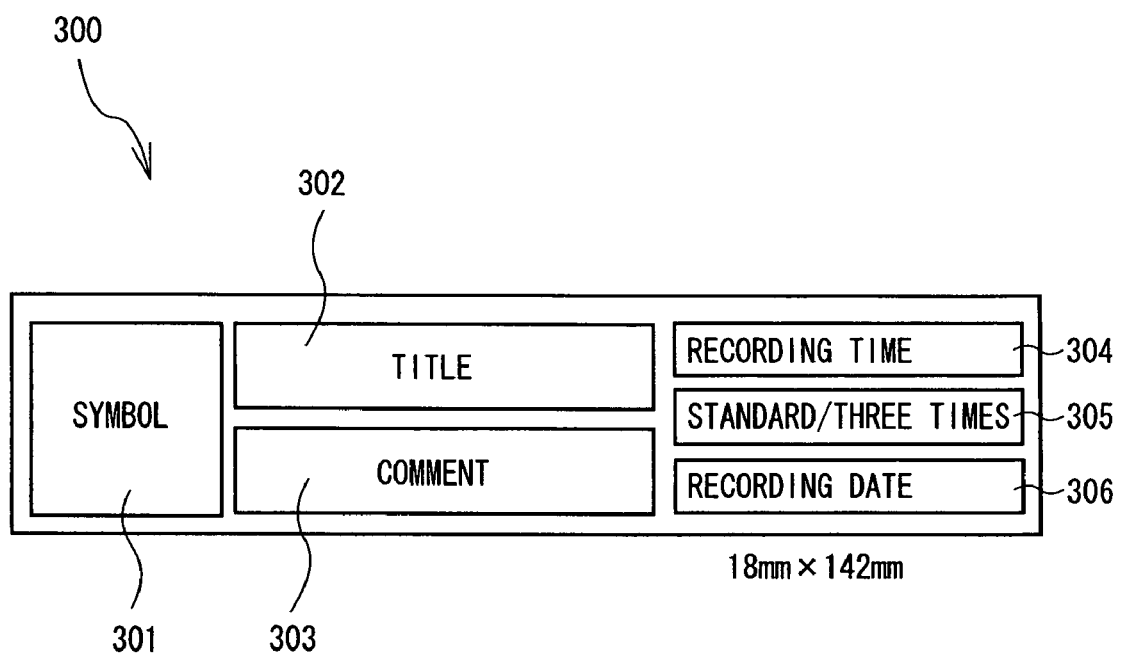
FIG. 7 is a diagram showing a specific example of VHS video printing format.

As an example, as shown in FIG. 7, the printing format (a printing format 300 for VHS video) of a "VHS video" provides a rectangular shape with a longer lateral side having a size of 18 mm vertically and 142 mm horizontally. The printing format comprises a block 301 which serves as data input area for symbol, a block 302 which serves as data input area for title, a block 303 which serves as data input area for comments, a block 304 which serves as data input area for recording time, a block 305 which serves as data input area for recording format and a block 306 which serves as data input area for recording date. Then, in the printing format 300 for VHS video, the block 301 is disposed on the left side, the blocks 302 and 303 are arranged vertically in line at the center and the blocks 304-306 are disposed vertically in line on the right sides.

Figure 8:
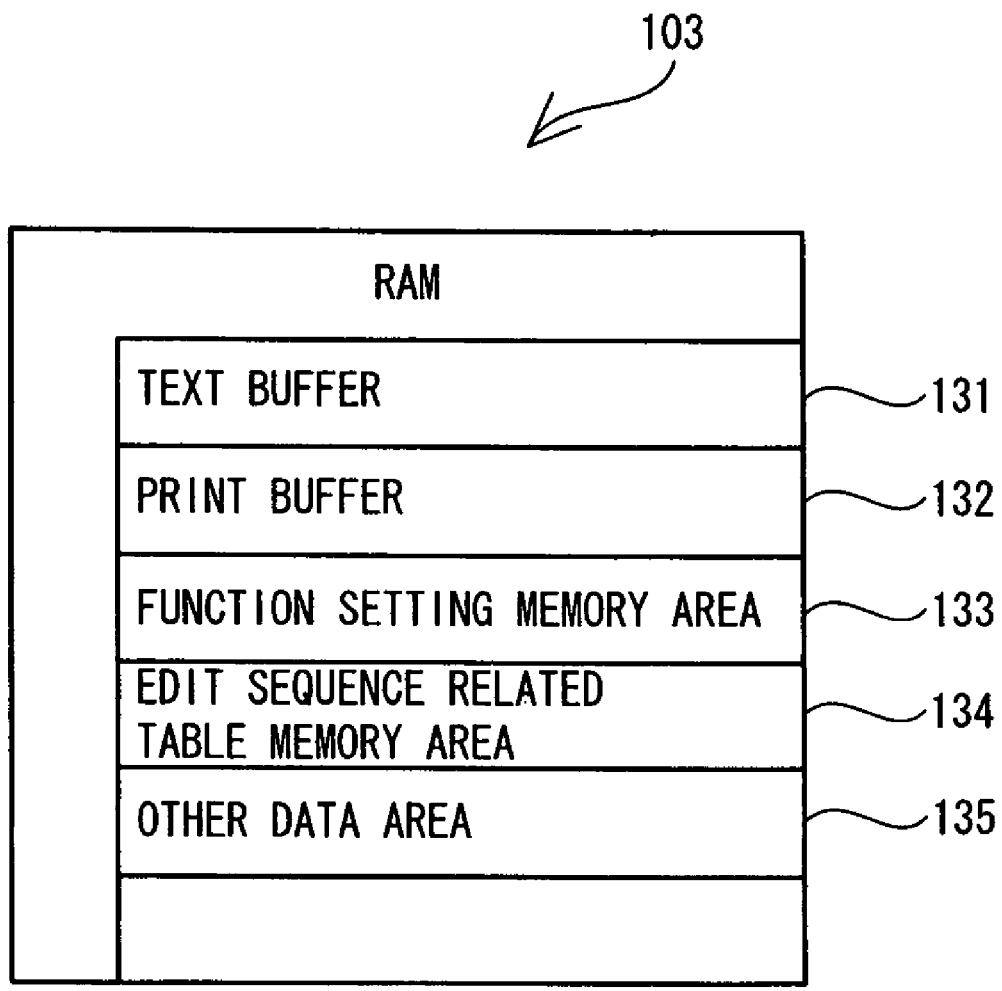
FIG. 8 is a schematic diagram showing the configuration of a RAM.

As shown in FIG. 8, the RAM 103 includes a text buffer 131, a print buffer 132, a function setting memory area 133, an edit sequence setting related table memory area 134 and an other data area 135 and so on. Document data input by means of the keyboard portion 3 and printing format data input as application data are stored in the text buffer 131. The print buffer 132 stores a plurality of printing dot patterns such as letters and symbols and number of pulses to be applied representing a dot formation energy quantity. The thermal head 11 prints with dots according to dot pattern data (print data) stored in the print buffer 132.

The function setting memory area 133 stores setting contents about functions for displaying, printing and like that of the tape printing apparatus 1. Although the function setting stored in the function setting memory area 133 (for example, language used and print setting) can be changed arbitrarily by a user or a manufacturer, contents that are predetermined are stored as a default value (for example, the language used in the initial condition is English) in the initial condition.

Further, a variety of tables regarding the block edit sequence of each printing format are stored in the edit sequence related table memory area 134. More specifically, a plurality of the edit sequence tables in which the edit sequence and the like of each block is determined are stored for each of the plural printing formats stored in the printing format memory area 123.

Figure 9:
FIG. 9 is a diagram showing data structure of an edit sequence table.

For example, the edit sequence table 400 shown in FIG. 9 is provided corresponding to the printing format 300 for VHS video, and it comprises an edit sequence number 401, a block number 402, a block name 403 and a new edit sequence number 404, as data item. Numbers indicating edit sequence of the blocks 301-306 of the printing format 300 for VHS video are set in the edit sequence number 401. Identification numbers of the blocks 301-306 are set up in the block number 402. Designations of the blocks 301-306 are set up in the block name 403. Further, the new edit sequence number 404 is a data area in which a number indicating new edit sequence is set when the edit sequence setting processing (see FIG. 14) described later is executed.

In the tape printing apparatus 1 having the above-described structure, when the power is turned ON, main processing (see FIG. 10) described later is executed by the CPU 101 based on the main control program stored in the ROM 102 (program memory area 122). If characters or the like are input through character keys of the keyboard portion 3 and execution of printing is instructed, the text (document data or input printing format) is stored successively in the text buffer 131 of the RAM 103. At the same time, a dot pattern corresponding to characters/symbols input by means of the keyboard portion 3 or a printing format or the like selected by a user is displayed based on dot pattern generation control program and display drive control program. The thermal head 11 is driven through the head drive circuit 107 so as to print a dot pattern data stored in the print buffer 132, and in synchronous with this, the tape feed motor 37 controls tape feed through the motor drive circuit 108. In the thermal head 11, heat generating elements are heat-driven selectively corresponding to print dots of a line through the head drive circuit 107 so as to print letters and the like on a tape. Finally, the cutter mechanism 14 cuts a tape discharged from the tape discharge portion 74 so as to produce a label.

Next, an operation of the tape printing apparatus 1 having the above-described structure will be described.

Figure 10:
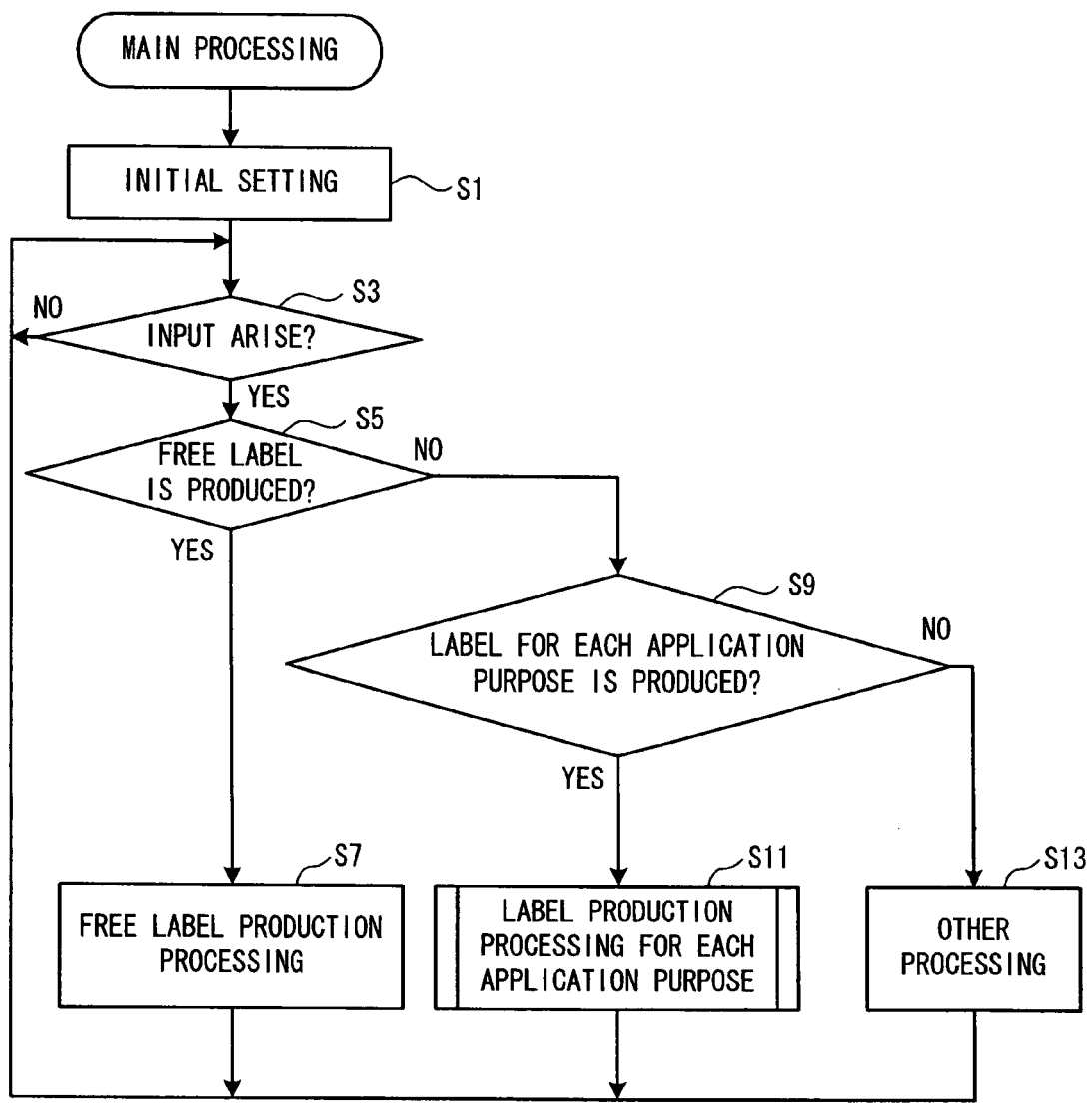
FIG. 10 is a main flowchart of a tape printing apparatus.

As shown in FIG. 10, when the tape printing apparatus 1 is turned ON and started, initialization of various initial values, flags and the like is executed (S1). Until an input is made by means of the keyboard portion 3 (S3: NO), the processing turns into a standby state. In case that an input is made by means of the keyboard portion 3 (S3: YES), if the input key 3A instructs about "production of free label" (S5: YES), a free label production processing in which a user produces a label by arbitrarily inputting characters or symbols without the use of the printing format is executed (S7). In the meantime, description of "production of free label" in this embodiment is omitted because it is the same as a conventional one.

Figure 11:
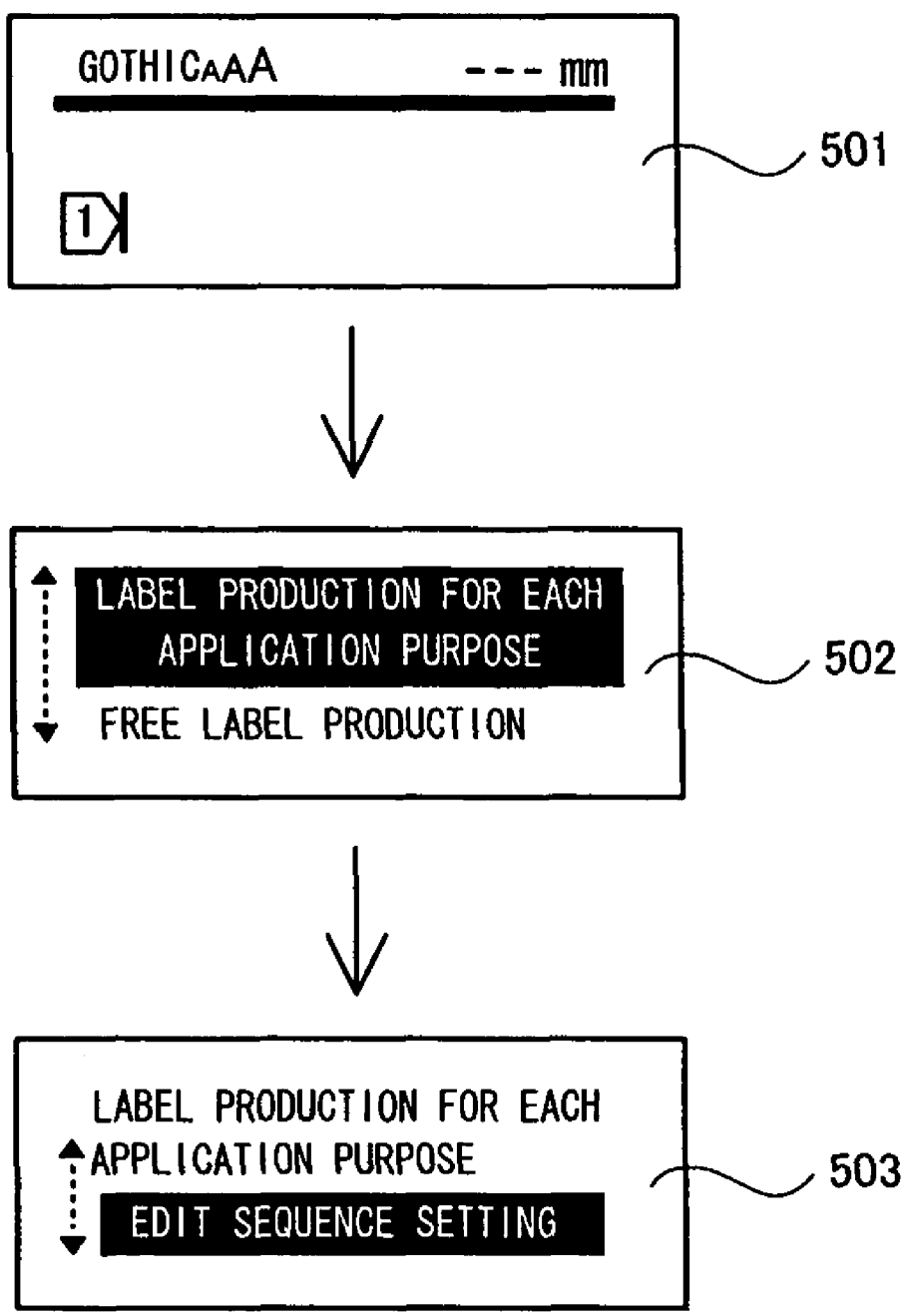
FIG. 11 is a transition diagram of a screen displayed on a liquid crystal portion during main processing (FIG. 10)

More specifically, as shown in FIG. 11, when the tape printing apparatus 1 is turned ON, an initial screen 501 is displayed on the liquid crystal display portion 4. In this initial screen 501, a user can executes various functional settings such as a display setting, a date setting and a print setting and can move to the other processing screen. Then, when the user executes a predetermined operation by means of the keyboard portion 3, a label production type-specifying screen 502 for specifying a label production type is displayed on the liquid crystal display portion 4. If the user selects a "free label production" through this label production type-specifying screen 502, the free label production processing (S7) is executed.

Returning to FIG. 10, if the key 3A input by means of the keyboard portion 3 instructs about "label production for each application purpose" (S5: NO, S9: YES), a label production processing for each application purpose whose label is produced by a user inputting arbitrary characters and symbols on a predetermined printing format is executed (S11). More specifically, as shown in FIG. 11, if the user selects the "label production for each application purpose" through the aforementioned label production type-specifying screen 502, label production processing for each application purpose (S11) is executed. In the meantime, the detail of "label production for each application purpose" in this embodiment will be described later.

Returning to FIG. 10, if the key 3A input by means of the keyboard portion 3 instructs about other processing (S9: NO), other processing corresponding to the instruction is executed (S13). In the meantime, after each processing of S7, S11, and S13 is executed, the processing returns to S3 so as to stand by for a next input.

Next, the detail of "label production for each application purpose" in the first embodiment will be described.

Figure 12:
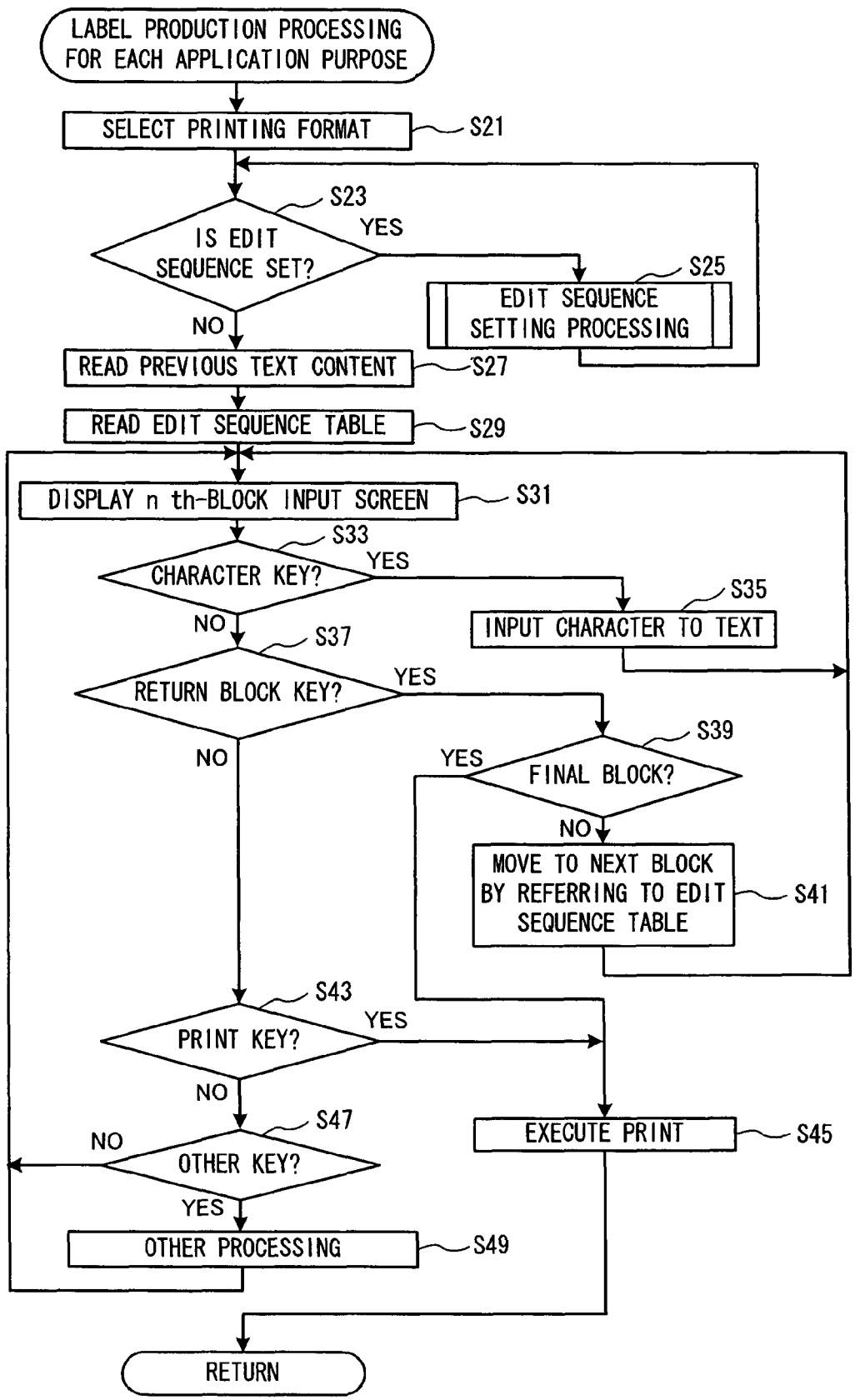
FIG. 12 is a flowchart showing details of label production processing for each application purpose in a first embodiment.
Figure 13:
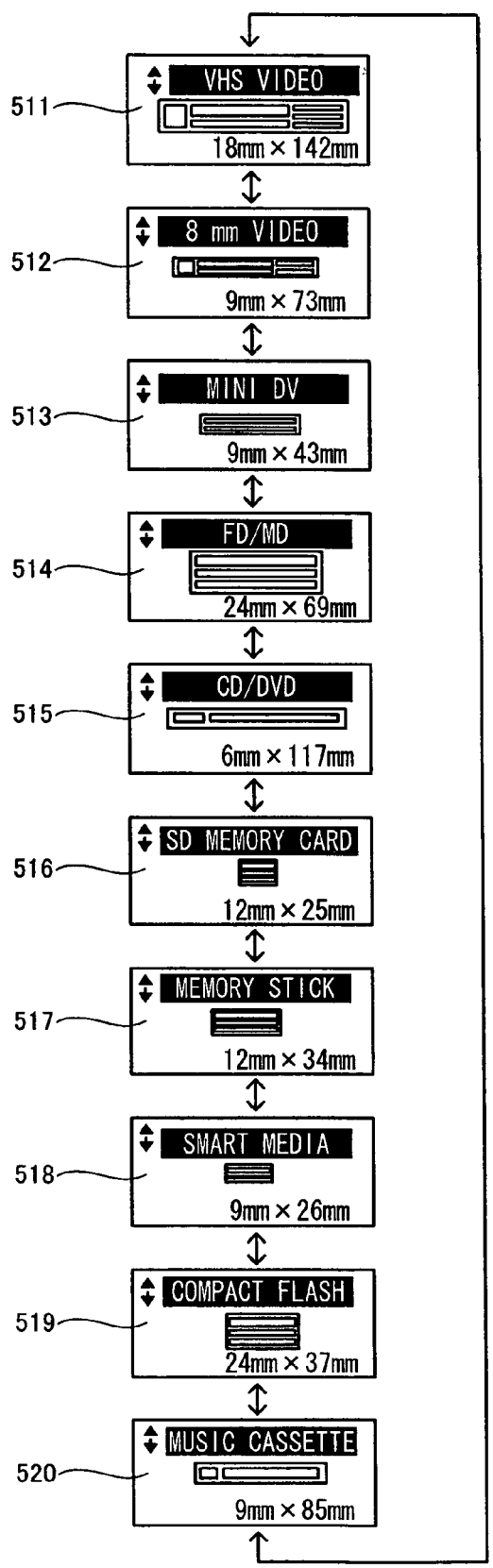
FIG. 13 is a transition diagram of a screen displayed on the liquid crystal display portion in the label production processing for each application purpose.

As shown in FIG. 12, in the label production processing for each application purpose (S1) of this embodiment, any printing format is selected by a user (S21). More specifically, as shown in FIG. 13, the user can display with switching from any one of layout screens 511-520 indicating each of the plural printing formats stored in the printing format memory area 123 on the liquid crystal display portion 4 by operating the keyboard portion 3. Thus, in S21, the user can specify any printing format for use in label production by displaying and selecting any of the layout screens 511-520. Here, assume that the user specifies the printing format 300 for VHS video (FIG. 7) by displaying and selecting the layout screen 511.

Next, if the key 3A input by means of the keyboard portion 3 instructs about an "edit sequence setting" (S23: YES), the edit sequence setting processing in which the user arbitrary sets a block edit sequence of a printing format selected in S21 is executed (S25). More specifically, as shown in FIG. 11, if the user selects the "label production for each application purpose" through the aforementioned label production type specifying screen 502, a label setting screen 503 for each application purpose for setting each application purpose is displayed on the liquid crystal display portion 4. If the user selects an "edit sequence setting" through the label setting screen 503 for each application purpose, following edit sequence-setting processing (S25) is executed. Here, a case where the block edit sequence of the printing format 300 for VHS video is arbitrarily set up by the user will be exemplified and described.

Figure 14:
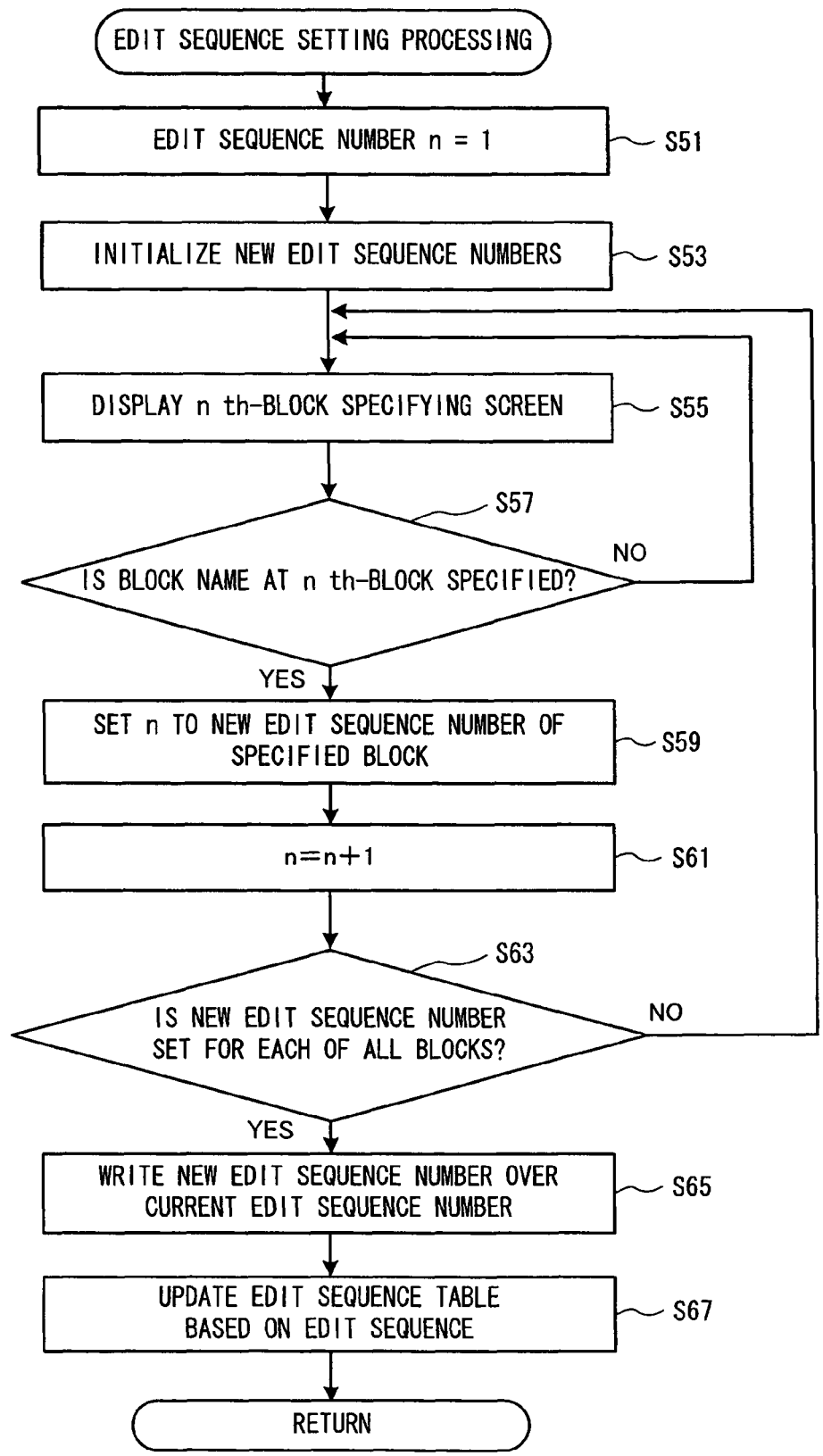
FIG. 14 is a flowchart showing details of edit sequence setting processing.

In the edit sequence setting processing (S25), as shown in FIG. 14, "1" is set in edit sequence number n (S51) and all new edit sequence numbers of edit sequence table corresponding to a printing format selected in S21 are initialized (S53). Here, in the edit sequence table 400 (FIG. 9) corresponding to the printing format 300 for VHS video, all data areas of the new edit sequence number 404 corresponding to six blocks are initialized.

Next, n th-block specifying screen in which a user arbitrarily sets the block edit sequence is displayed on the liquid crystal display portion 4 (S55). If a block name of the n th-block is specified on this n th-block specifying screen (S57: YES), n is set in the new edit sequence number of the block specified in S57 (S59). On the other hand, unless a block name of n th-block is specified (S57: NO), the processing returns to S55 so as to stand by for the specification of a block name by the user.

After S59 is executed, n is incremented by "1" (S61). Concerning all blocks constituting the printing format selected in S21, whether or not the new edit sequence number is set is determined (S63). Unless the new edit sequence number is set for each of all blocks (S63: NO), the processing returns to S55, in which a next n-block specifying screen is displayed and user specifies the next block name in edit sequence (S57-S59). The above-described processing is executed repeatedly until the new edit sequence numbers are set for all the blocks (S55-S63: NO).

More specifically, because the printing format 300 for VHS video is constituted of six blocks as shown in FIG. 15, six n th-block specifying screens are displayed successively on the liquid crystal display portion 4 corresponding to an operation of the keyboard portion 3. Because first, a first block-specifying screen 521 is displayed, a user specifies a block name of a block (first block), which is the first in the edit sequence through this first block-specifying screen 521. Next, because a second block-specifying screen 522 is displayed, the user specifies a block name of a block (second block), which is the second in the edit sequence through this second block-specifying screen 522. Likewise, by specifying each block name of third-sixth blocks through the third-sixth block-specifying screen, user sets up a new edit sequence of all the blocks constituting the printing format 300 for VHS video.

Consequently, as indicated in the edit sequence table 400*a* shown in FIG. 16, a number n indicating that a block is specified on the n th-block specifying screen is set in the new edit sequence number 404 corresponding to each block name 403. For example, because a "title" of the block name 403 is specified on the first block specifying screen 521 shown in FIG. 15, "1" is set in the new edit sequence number 404 corresponding to this. In the meantime, the edit sequence table 400*a* indicates that the user has set a new block edit sequence in the order of "title", "recording date", "comments", "recording format", "recording time" and "symbol".

If the processing returns to FIG. 14 in which the new edit sequence number is set for all the blocks (S63: YES), a new edit sequence number is written over a current edit sequence number in each block of the edit sequence table (S65). Then, arrangement of each block on the edit sequence table is updated based on the edit sequence number (that is, a new edit sequence number) after being overwritten (S67) and the processing returns to the main processing (FIG. 10).

More specifically, when as shown in FIG. 16, the new edit sequence number 404 of each block is set in the aforementioned edit sequence table 400*a*, the current edit sequence number 401 is written over the new edit sequence number 404 in each block (see the edit sequence table 400*b*). Then, arrangement of each block is updated based on the edit sequence number 401 (that is, a new edit sequence number 404) after being overwritten (see the edit sequence table 400*c*). As a result, in the edit sequence table 400*c*, the block edit sequence and block arrangement are set up in the order of "title", "recording date", "comments", "recording format", "recording time", and "symbol".

In the edit sequence setting processing (S25) shown in FIG. 14, when a user wants to set the block edit sequence of the printing format 300 for VHS video, each block name is set in an arbitrary order from the n th-block specifying screen (first block specifying screen 521, second block specifying screen 522, . . . ), the block edit sequence defined in the edit sequence table 400 can be changed arbitrarily.

When the processing returns to FIG. 12, if the key 3A input by means of the keyboard portion 3 does not instruct about "edit sequence setting" (S23: NO), a label production using the printing format is executed in a following procedure. Here, a case where a user selects the "label production" through the label setting screen 503 for each application purpose shown in FIG. 11 so as to produce a label using the printing format 300 for VHS video (and edit sequence table 400*c*) will be exemplified and described.

If there is a text previously input about the printing format selected in S21, that text content is read from a predetermined memory area of the RAM 103 (S27). As a consequence, if user needs to input the same data as before, the user can omit inputting it.

Next, an edit sequence table corresponding to a printing format selected in S21 is read from the edit sequence related table memory area 134 (S29). Here, the edit sequence table 400 (FIG. 9) corresponding to the printing format 300 for VHS video targeted for use is read into a predetermined memory area of the RAM 103.

Then, the n th-block input screen is displayed on the liquid crystal display portion 4 (S31). The n th-block input screens are plural data input screens in which a user uses to input data for each block constituting the printing format. The n th-block input screen displayed first (that is, a first block input screen) is a screen for inputting data into a block in which the edit sequence number "1" is set in the edit sequence table read in S29.

If the key 3A input by means of the keyboard portion 3 is a character key (S33: YES), characters or symbols are input to a text corresponding to the n th-block input screen (S35) and stored in a text buffer 131 of the RAM 103 and then, the processing returns to S31, in which the input content is displayed on the n th-block input screen.

If the key 3A input by means of the keyboard portion 3 is a return block key (S33: NO, S37: YES), unless a n th-block input screen displayed currently corresponds to a final block (S39: NO), the processing moves to a next block by referring to the edit sequence table read in S29 (S41). Then, the processing returns to S31, in which a n th-block input screen for inputting data into a next block is displayed so as to stand by for a character input (S33) or block moving instruction (S37) from user.

Figure 17:
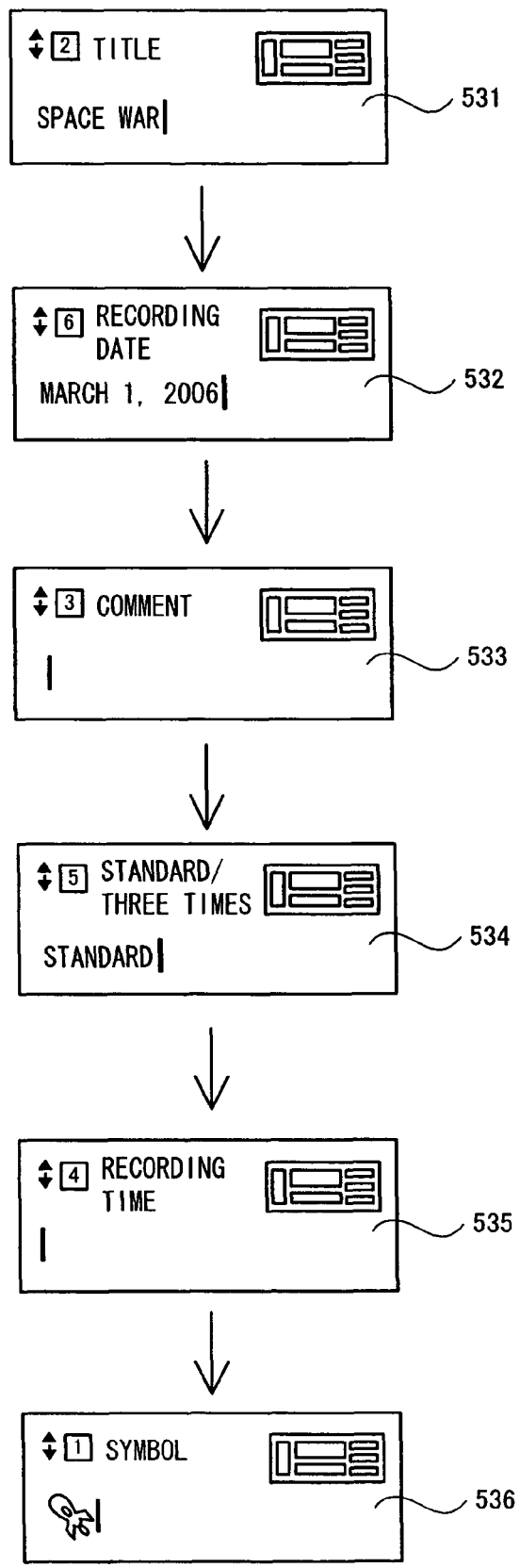
FIG. 17 is a transition diagram of a screen displayed on the liquid crystal display portion in the label production processing for each application purpose.

More specifically, because the printing format 300 for VHS video is constituted of six blocks as shown in FIG. 17, the six n th-block input screen are displayed successively on the liquid crystal display portion 4 corresponding to an operation of the keyboard portion 3 by a user in the order set in the edit sequence number 401 of the edit sequence table 400c (see FIG. 16). Because first, a first block input screen 531 for inputting "title" is displayed, the user inputs a desired title through this first block input screen 531. Next, because a second block input screen 532 for inputting a "recording date" is displayed when the user presses the return block key, the user inputs a desired recording date through this second block input screen 532. Likewise, the user displays a third block input screen 533, a fourth block input screen 534, a fifth block input screen 535 and a sixth block input screen 536 successively by operating the return block key and inputs a desired comment, a recording format, a recording time and a symbol.

In the meantime, because the previous text content is read in S27, if the n th-block input screen shown in S31 corresponds to a block in which the data was input previously, its input content is also displayed on the n th-block inputting screen. For example, if the user previously produced a label using the printing format 300 for VHS video and at that time input a "rocket" symbol as a symbol, the previously input "rocket" symbol is displayed as it is on the sixth block input screen 536 for inputting the "symbol". Thus, if the user wants to use the "rocket" as a symbol again, he can omit inputting it.

On the other hand, if the key 3A input by means of the keyboard portion 3 is a print key (S37: NO, S43: YES) or if the n th-block input screen currently displayed by pressing the return block key corresponds to a final block (S39: YES), a print processing is executed (S45). Speaking more in detail, dot patterns corresponding to a text stored in the text buffer 131 or printing format is displayed on the liquid crystal display portion 4 and at the same time, a print of dot pattern data (print data) by the thermal head 11 and a tape feed control by the tape feed motor 37 are executed synchronously. Consequently, a character or symbol to be printed is printed on a tape according to the printing format and finally, the tape is cut with the cutter mechanism 14 so as to produce a piece of the label.

If the key 3A input by means of the keyboard portion 3 is other key (S43: NO, S47: YES), the other processing corresponding to the input is executed (S49). Unless the key input is performed (S47: NO) or after S49 is executed, the processing returns to S31, so as to stand by for input by a user and after S45 is executed, the processing returns to the main processing (FIG. 10).

Figure 25:
FIG. 25 is a diagram showing a specific example of a label produced based on the printing format after data input.

In the label production processing for each application purpose (S11) shown in FIG. 12, if the user wants to produce a label based on the printing format 300 for VHS video, he inputs a desired data successively through the n th-block input screen (first block input screen 531, second block input screen 532, . . . ). As a consequence, a label 920 suitable for being affixed to the VHS video as conventional label can be produced easily and rapidly (see FIG. 25).

In the tape printing apparatus 1 of the first embodiment, if the user selects the printing format 300 for VHS video for use in producing the label and assigns block names for identifying the plural blocks 301-306 constituting this in an arbitrary order through the n th-block specifying screen (first block specifying screen 521, second block specifying screen 522, . . . ), the edit sequence number 401 (that is, block edit sequence) is updated based on the specifying order of the block name 403 in the edit sequence table 400. Then, in order to produce a label using the printing format 300 for VHS video in which the block edit sequence is changed, a user successively inputs desired data through the n th-block input screen (first block input screen 531, second block input screen 532, . . . ). Consequently, the data is input to the blocks 301-306 following a block edit sequence arbitrarily set by the user.

Thus, in producing print data using the printing format 300 for VHS video constituted of the plural blocks 301-306, the data can be input into data input area (blocks 301-306) of the printing format 300 for VHS video in a suitable edit sequence for the user. As a consequence, errors in data input can be blocked and the operation efficiency can be improved. The user can specify an edit sequence of the blocks 301-306 arbitrarily by selecting block names of the plural blocks 301-306 in an arbitrary order.

Next, a second embodiment will be described with reference to the accompanying drawings. Although the tape printing apparatus 1 of this embodiment is basically as same as that of the first embodiment, it is different in the setting method of the block edit sequence of the printing format. Hereinafter, different points from the first embodiment will be described.

First, the data structure of the edit sequence table stored in the edit sequence related table memory area 134 of the RAM 103 is different from the first embodiment. For example, an edit sequence table 600 shown in FIG. 18 is a table provided corresponding to the printing format 300 for VHS video (see FIG. 7) and includes an edit sequence number 601, a block number 602, and a block name 603, as data item like the edit sequence table 400 (see FIG. 9). Then, it is provided with an edited flag 604 which is a data area in which a flag indicating whether or not each block is supplied with data input at the time of last label production is set. Although in the edited flag 604, "1" indicating "ON" is set in the block supplied with data input and "0" indicating "OFF" is set in the block not supplied with data input, "0" is set in all the blocks in the initial condition.

Further, according to this embodiment, the edit sequence related table memory area 134 includes an edit YES list 610 (see FIG. 21) which is a data area for storing the block supplied with data input at the time of last label production and an edit NO list 620 (see FIG. 21) for storing the block not supplied with data input at the time of last label production and its detail will be described later.

Next, the detail of the "label production for each application purpose" of the second embodiment will be described.

Figure 19:
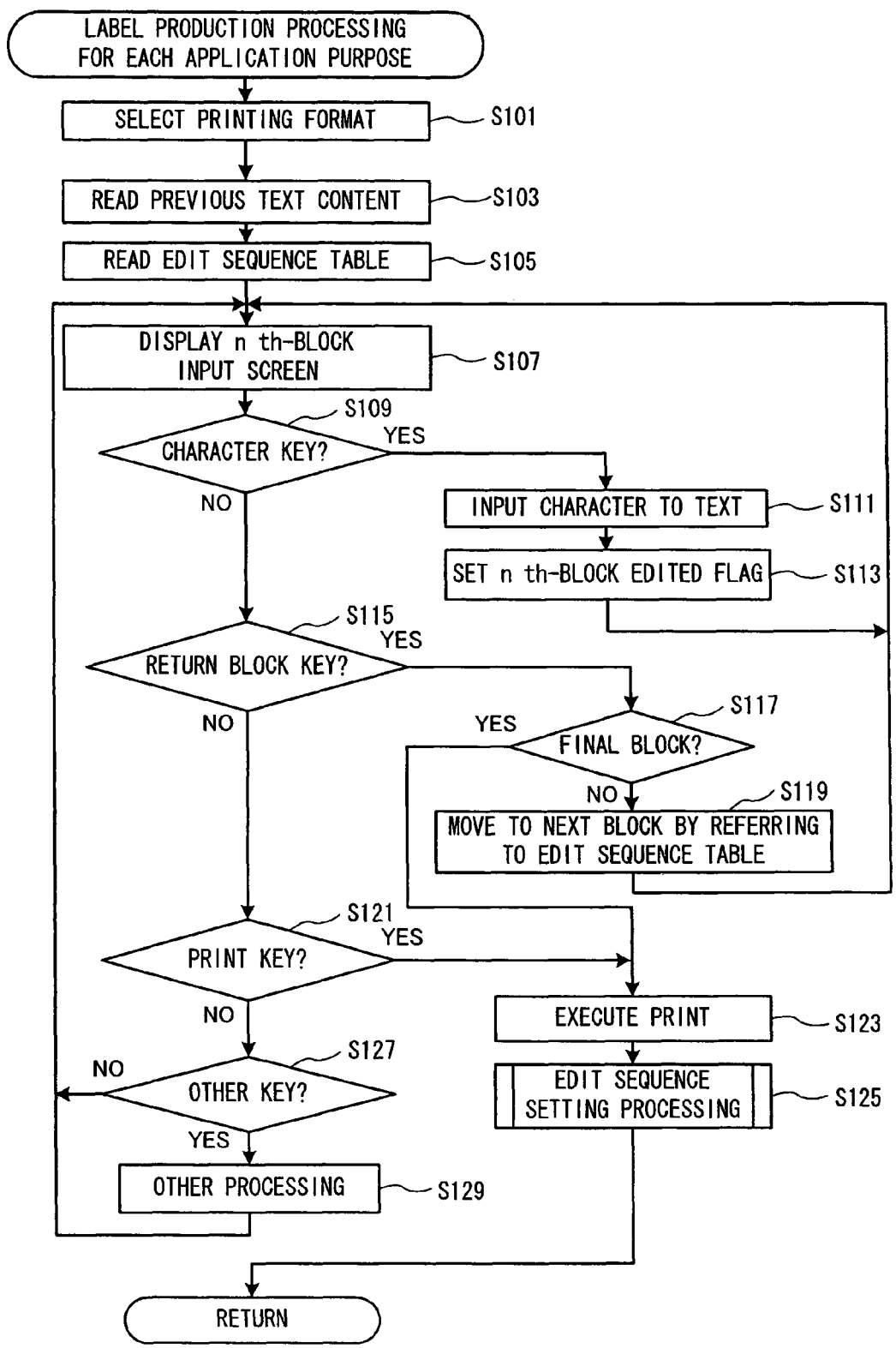
FIG. 19 is a flow chart showing details of label production processing for each application purpose in a second embodiment.

In the label production processing for each application purpose (S11) of this embodiment, as shown in FIG. 19, a selection of the printing format (S101), a reading of a last text content (S103) and a reading of the edit sequence table (S105) are executed like the first embodiment (see FIG. 12). Here assume that the printing format 300 for VHS video is selected by a user and a corresponding edit sequence table 600 is read in.

Next, like the first embodiment, the n th-block input screen is displayed on the liquid crystal display portion 4 (S31) and when a character key is input, the character or the like is input into a text (S109: YES, S111). If the return block key is input (S109: NO, S115: YES) and the n th-block is not a final block (S117: NO), the processing moves to a next block by referring to the edit sequence table (S119). If the print key is input (S115: NO, S121: YES) or the return block key is input and the n th-block is a final block (S117: YES), the label print is executed (S123). If other key is input, a processing corresponding to that input is executed (S127: YES, S129).

Figure 24:
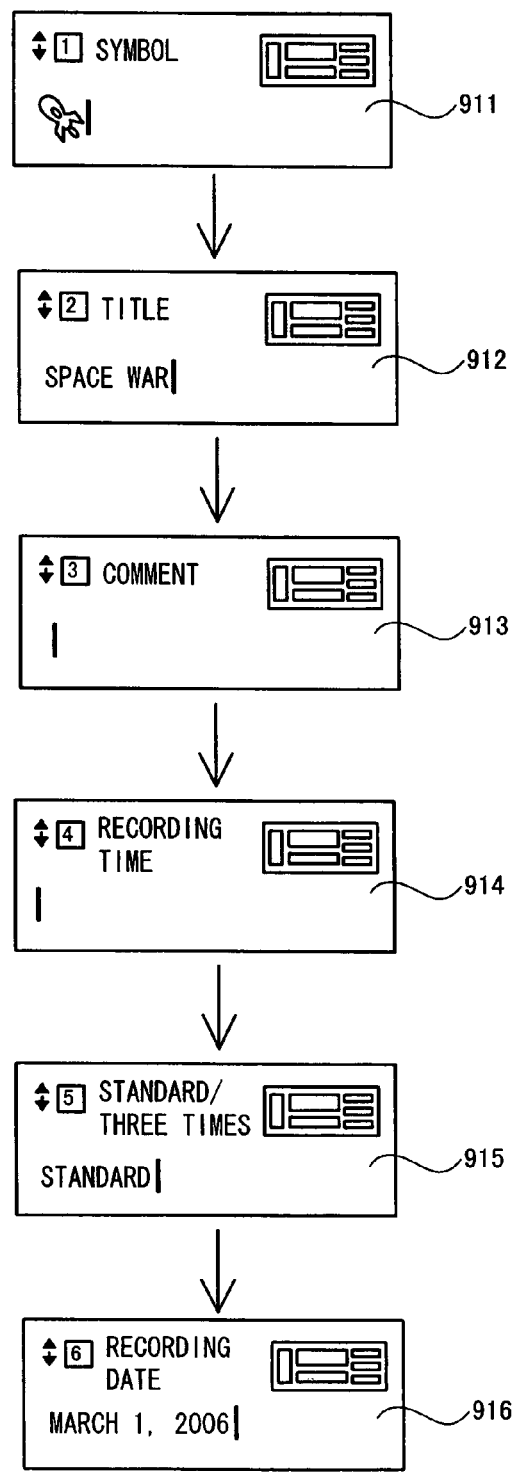
FIG. 24 is a screen transition diagram showing data input sequence to a printing format.

More specifically, because the edit sequence number 601 (block edit sequence) in the initial condition is set in the edit sequence table 600 shown in FIG. 18, the user inputs data through the n th-block input screen in the order of "symbol", "title", "comment", "recording time", "recording format" and "recording date". Assume that, like the conventional screen transition shown in FIG. 24, characters are input to each block (screens 911, 912, 915, and 916) of "symbol", "title", "recording format", "recording date" while nothing is input to each block (screens 913 and 914) of "comment" and "recording time".

In this embodiment, if characters or the like are input to a text with the character keys (S111), an edited flag of a block corresponding to that text is set to ON in the edit sequence table read in S105 (S113). For example, because a symbol indicating "robot" is already input to the block (screen 911) of the "symbol", "1" indicating "ON" is set in the edited flag 604 corresponding to the "symbol" in the edit sequence table 600a in FIG. 21. Likewise, "1" is set in each of the edited flags 604 of "comment", "recording time" and "symbol" in which a user input data in the edit sequence table 600a and "0" indicating "OFF" is set in the edited flag 604 of "comment" and "recording time" in which the user did not input data.

In this embodiment, after the label print is executed (S123), the following edit sequence setting processing (S125) is executed. Here, a case where the block edit sequence of the printing format 300 for VHS video is automatically set depending on whether or not last data input was carried out will be exemplified and described.

Figure 20:
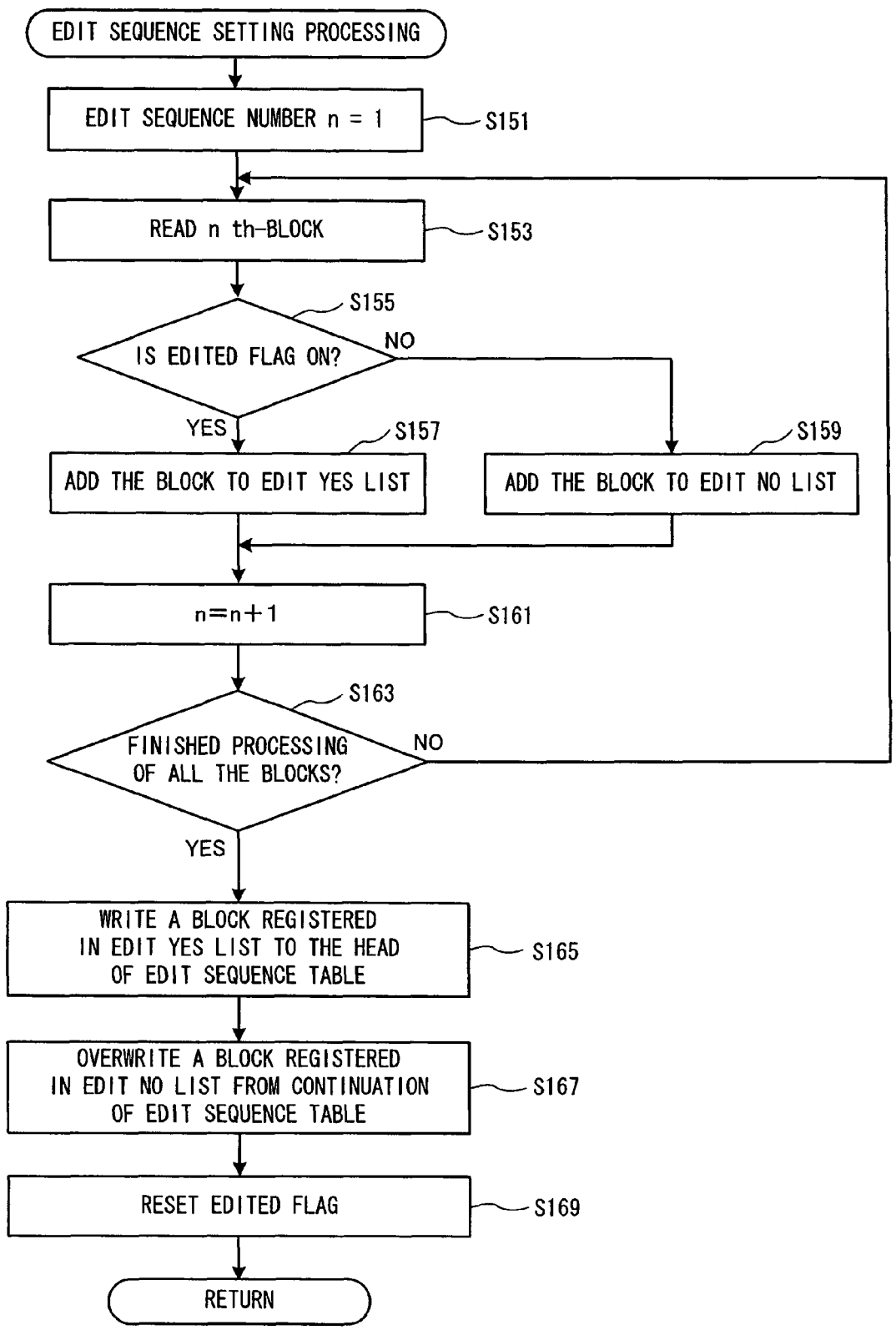
FIG. 20 is a flowchart showing the detail of the edit sequence setting processing.

In the edit sequence setting processing (S125), as shown in FIG. 20, "1" is set in the edit sequence number n (S151) and n th-block is read in from the edit sequence table read in S105 (S153). Then, whether or not the block edited flag read in S153 is "ON" is determined (S155). Here, the n th-block in term of the edit sequence number 601 is read from the edit sequence table 600 (FIG. 18) corresponding to the printing format 300 for VHS video and if the edited flag 604 of that block is "1", it is determined that the edited flag is "ON".

Then, if the edited flag is "ON" (S155: YES), the block read in S153 is added to the edit YES list (S157). On the other hand, if the edited flag is "OFF" (S155: NO), the block read in S153 is added to the edit NO list (S159). After S157 or A159 is executed, n is incremented with "1" (S161). Concerning all blocks constituting the printing format selected in S101, whether or not a processing of adding to the edit YES list or the edit NO list is carried out (S163). If no processing is carried out for all the blocks (S163: NO), the processing returns to S153, in which a next block is read from the edit sequence table and the corresponding block is added to the edit YES list or the edit NO list corresponding to the edited flag (S155-S159). The above-described processing is executed repeatedly until it is executed for all the blocks (S153-S163: NO).

More specifically, because as shown in FIG. 21, "1" is set in the edited flag 604 corresponding to each of the blocks of "symbol", "title", "recording format" and "recording date" in the aforementioned edit sequence table 600a, these block names are added to the edit YES list 610 successively and on the other hand, because "0" is set in the edited flag 604 corresponding to each of the blocks of "comment" and "recording time", these block names are added to the edit NO list 620 successively.

Returning to FIG. 20, if the processing is carried out for all the blocks (S163: YES), a block registered in the edit YES list in S157 is overwritten from the head of the edit sequence table read in S105 (S165). Further, a block registered in the edit NO list in S159 is overwritten from a continuation of the edit sequence table read in S105 (S167). In the edit sequence table updated and overwritten in S165 and S167, the edited flag of each block is reset (that is, "0" is set) (S169) and the processing returns to the label production processing for each application purpose (FIG. 19).

More specifically, as show in FIG. 21, each block of "symbol", "title", "recording format", "recording date" registered in the aforementioned edit YES list 610 is overwritten from the head of the aforementioned edit sequence table 600a. Thus, "1" block of the edit sequence number 601 turns to "symbol", "2" block turns to "title", "3" block turns to "recording format" and "4" block turns to "recording date" (see the edit sequence table 600b). Each block of "comment" and "recording time" registered in the edit NO list 620 is overwritten from a continuation of the edit sequence table 600a. Thus, "5" block of the edit sequence number 601 turns to "comment" and "6" block turns to "recording time" (see the edit sequence table 600b). As a result, the block edit sequence and block arrangement are set in the order of "symbol", "title", "recording format", "recording date", "comment" and "recording time" in the edit sequence table 600b.

In the edit sequence setting processing (S125) shown in FIG. 20, if the user produces a label using the printing format 300 for VHS video, the block edit sequence defined in the edit sequence table 600 can be automatically changed so that the blocks 301, 302, 305, and 306 supplied with data input come to a front side in the edit sequence while the blocks 303 and 304 supplied with no data input comes to an end side in the edit sequence.

If the label is produced using the printing format 300 for VHS video for the next time, the edit sequence table 600b is read in the label production processing for each application purpose (S105). Then, the user produces a label by inputting data successively into each block in the block edit sequence defined on this edit sequence table 600b (S107-S129).

Figure 22:
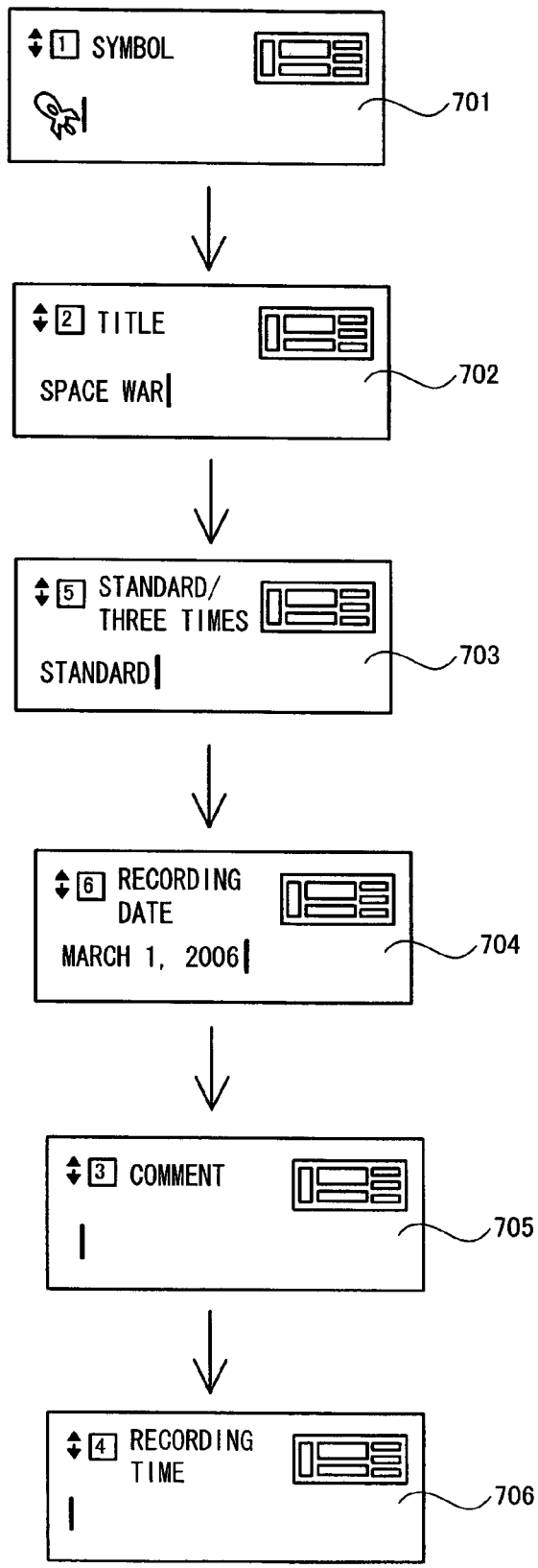
FIG. 22 is a transition diagram of the screen displayed on the liquid crystal display portion in label production processing for each application purpose.
Figure 23:
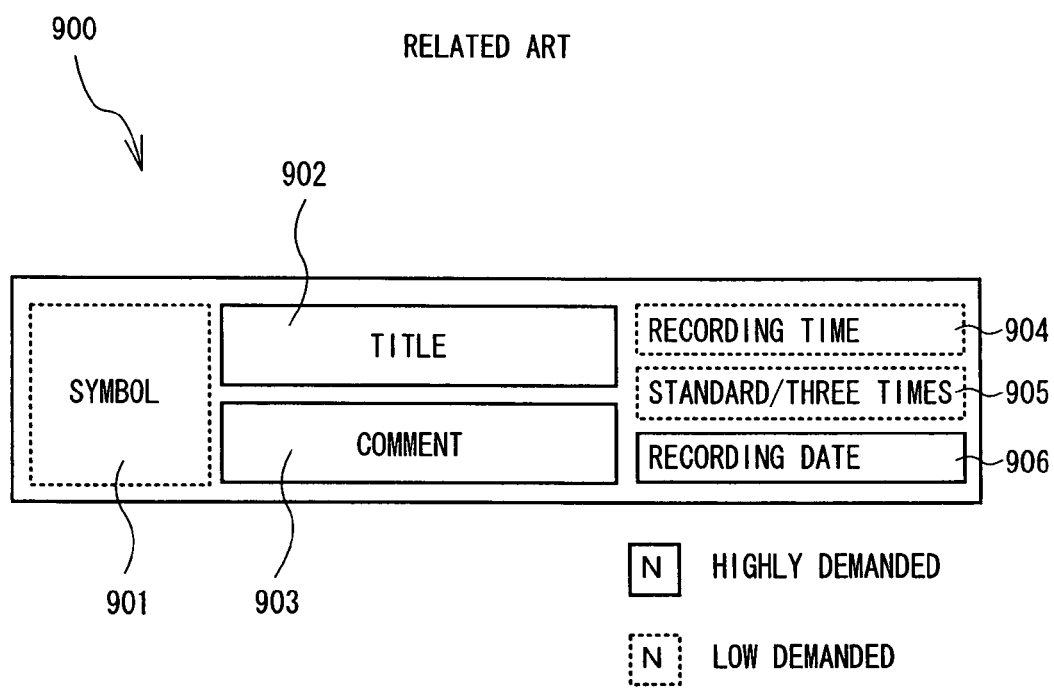
FIG. 23 is a data structure diagram of printing format for use in a conventional printer.

More specifically, because as shown in FIG. 22, the printing format 300 for VHS video is constituted of six blocks, six nth-block input screens are displayed successively on the liquid crystal display portion 4 corresponding to an operation of the keyboard portion 3 by the user in an order set in the edit sequence number 601 of the edit sequence table 600b (see FIG. 21). Because first, a first block input screen 701 for inputting "symbol" is displayed, the user inputs a desired symbol through this first block input screen 701. Next, because a second block input screen 702 for inputting "title" is displayed when the user presses the return block key, the user inputs a desired title through the second block input screen 702. The user displays third block input screen 703, fourth block input screen 704, fifth block input screen 705 and sixth block input screen 706 by operating the return block key and then inputs a desired recording format, recording date, comments, and recording time successively.

In the label production processing (S11) for each application purpose shown in FIG. 19, if the user wants to produce a label based on the printing format 300 for VHS video, he inputs desired data successively through the n th-block input screen (first block input screen 701, second block input screen 702, . . . ). As a consequence, a label 920 suitable for being affixed to VHS video as conventional label can be produced easily and rapidly (see FIG. 25).

In the tape printing apparatus 1 of the second embodiment mentioned above, when the user selects the printing format 300 for VHS video for use in producing a label and inputs data into the plural blocks 301-306 from the n th-block input screen (that is, screen 911, screen 912, . . . ) along the edit sequence number 601 (that is, block edit sequence) of the edit sequence table 600, the edit sequence number 601 (that is, block edit sequence) is updated so that a block supplied with data input comes first and a block not supplied with data input comes after, based on whether or not data input arises (that is, edit YES list 610 and edit NO list 620) in the edit sequence table 600. When the label is produced using the printing format 300 for VHS video next time, if the user inputs desired data successively from the n th-block input screen (first block input screen 701, second block input screen 702, . . . ), data is input to the blocks 301-306 according to a block edit sequence changed automatically at the time of last label production.

Consequently, when a print data is produced using the printing format 300 for VHS video constituted of the plural blocks 301-306, the user can input data into the data input areas (blocks 301-306) of the printing format 300 for VHS video in an appropriate edit sequence for the user and errors in data input can be blocked thereby improving operation efficiency. Further, the edit sequence of the plural blocks 301-306 can be changed so that the data can be preferentially input to blocks 301, 302, 305, and 306 in which the user has input data when the printing format 300 for VHS video is edited (label is produced) for the next time.

In the meantime, the disclosure is not restricted to the above-described embodiments but needless to say, may be improved or modified in various ways within a range not departing from the spirit of the invention. In the above embodiment, the tape printing apparatus 1 has been exemplified as the "printing apparatus". However, the disclosure can be applied to a variety of printing apparatuses regardless of the type of a recording object medium or the type of a recording paper and fabric and its printing method may be of thermal system, ink jet system or any other printing system.

According to the first embodiment, when the user specifies block names in any order from then th-block specifying screen (first block specifying screen 521, second block specifying screen 522, . . . ), the block edit sequence is specified. However, "block identification information" may be of any type as long as it can specify each block and for example, the user may specify the block edit sequence by specifying the block number 402 in any order.

According to the second embodiment, the block edit sequence defined by the edit sequence table 600 is updated using the edit YES list 610 and the edit NO list 620. However, if the block edit sequence can be changed to the one reflecting whether or not data input by the user arises, the edit sequence table 600 may be updated by other method. For example, in the edit sequence table 600, the edit sequence of a block in which "1" is set in the edited flag 604 may be automatically advanced.

Needless to say, the tape printing apparatus 1 and main control program may be installed by combining the first and second embodiments so that the user can arbitrarily change the block edit sequence and the block edit sequence is automatically changed corresponding to data input by the user.

In the printing apparatus of the disclosure, if any one is selected from the plural formats constituted of plural blocks for forming a data input area, the edit sequence of the plural blocks defined in that format is changed. Consequently, when the print data is produced using the format constituted of the plural blocks, data can be input to the data input area of the format in a preferable edit sequence to the user thereby blocking errors in data input and improving operation efficiency.

In the printing apparatus of the disclosure, if the edit sequence of the plural blocks is specified, the edit sequence of the plural blocks is changed based on its specified content. Thus, the user can arbitrarily specify the edit sequence of the plural blocks about an arbitrary format.

In the printing apparatus of the disclosure, if the block identification information for identifying each of the plural blocks is specified in an arbitrary sequence, the edit sequence of the plural blocks is changed based on the selection order of the plural pieces of the block identification information. Thus, the user can arbitrarily specify the edit sequence of the plural blocks by arbitrarily selecting the plural pieces of the block identification information in an arbitrary order.

In the printing apparatus of the disclosure, when a print information such as any image and character is input to the plural blocks along the edit sequence of the plural blocks defined in the selected format, the edit sequence of the plural blocks is changed based on whether or not the print information is input. Thus, the user can arbitrarily change the edit sequence of the plural blocks by inputting the print information into each block of any format.

In the printing apparatus of the disclosure, the edit sequence of the plural blocks is changed so that a block in which the print information is input comes first while a block in which no print information is input comes after based on the block input setting table in which whether or not the print information is input into each of the plural blocks is set. Consequently, the user can change the edit sequence of the plural blocks so that the user can preferentially input data to the block in which the user has previously input data at the time of next format editing.

In the printing apparatus of the disclosure, the recording object medium is a long tape comprised of a print medium, an adhesive agent layer and a separation layer and the label is produced by cutting the recording object medium on which the print data is printed. Thus, the disclosure can be applied to a tape printing apparatus for producing the label by printing a long tape.

In the format edit program of the disclosure, if any one is selected from the plural formats constituted of plural blocks for forming a data input area by executing the program using computer, the edit sequence of the plural blocks defined by the format is changed. Thus, if the print data is produced using the format constituted of the plural blocks, user can input data to the data input area of the format in a preferable edit sequence for user thereby blocking errors in data input and improving operation efficiency.

In the format edit program of the disclosure, if the edit sequence of the plural blocks is specified by executing that program using computer, the edit sequence of the plural blocks is changed based on its specified content. Thus, user can arbitrarily specify the edit sequence of the plural blocks in any format.

In the format edit program of the disclosure, if the block identification information for identifying each of the plural blocks is specified in an arbitrary order by executing that program using computer, the edit sequence of the plural blocks is changed based on a selection order of the plural pieces of the block identification information. Thus, the user can specify the edit sequence of the plural blocks arbitrarily by selecting the plural pieces of the block identification information in an arbitrary order.

In the format edit program of the disclosure, if the print information such as any image or character is input to the plural blocks along the edit sequence of the plural blocks defined in a selected format by executing the program using computer, the edit sequence of the plural blocks is changed based on whether or not the print information is input. Thus, the user can arbitrarily change the edit sequence of the plural blocks by inputting the print information into each block of any format.

In the format edit program of the disclosure, when the program is executed using computer, the edit sequence of the plural blocks is changed so that a block in which the print information is input comes first while a block in which no print information is input comes after based on the block input setting table in which whether or not the print information is input into each of the plural blocks is set. Thus, the edit sequence of the plural blocks can be changed so that the user can preferentially input data to the block in which the user has previously input data at the time of next format editing.

In the format edit program of the disclosure, the label is produced by cutting the recording object medium on which the print data is printed when that program is executed using computer. Thus, the label is produced by cutting the recording object medium after the print data is printed.

The printing apparatus and format edit program of the disclosure can be used for the tape printing apparatus which prints the print data produced based on the format for inputting data into the data input area specified for each recording object medium.

What is claimed is:

1. A printing apparatus comprising:
   a format memory device that stores plural formats constituted of plural blocks for forming a data input area specified for each recording object medium and defining an edit sequence of the plural blocks so as to input data into the data input area;
   a format selecting device that selects any one format from the plural formats stored in the format memory device;
   a block edit sequence changing device that changes the edit sequence of the plural blocks defined by the format for the format selected by the format selecting device;
   a printing device that prints print data produced based on the selected format on the recording object medium;
   a print information input device that inputs a print information of any image or character into each of the plural blocks along the edit sequence of the plural blocks defined by a format selected by the format selecting device, wherein the block edit sequence changing device changes the edit sequence of the plural blocks based on whether or not the print information is input by the print information input device; and
   a block input setting table memory device that stores a block input setting table in which whether or not the print information is input into each of the plural blocks by the print information input device is set, wherein the block edit sequence changing device changes the edit sequence of the plural blocks so that a block in which the print information is input comes first while a block in which no print information is input comes after, based on the block input setting table.

2. The printing apparatus according to claim 1 further comprising a block edit sequence specifying device that specifies the edit sequence of the plural blocks wherein the block edit sequence changing device changes the edit sequence of the plural blocks based on the edit sequence specified by the block edit sequence specifying device.

3. The printing apparatus according to claim 2 further comprising a block identification information display device that displays pieces of block identification information for identifying each of the plural blocks such that they are capable of being selected, wherein
   the block edit sequence specifying device specifies plural pieces of block identification information displayed on the block identification information display device in an arbitrary order and the block edit sequence changing device changes the edit sequence of the plural blocks based on a selection order of the plural pieces of block identification information specified by the block edit sequence specifying device.

4. The printing apparatus according to claim 1 wherein the recording object medium is a long tape comprising a print medium on which an image is to be printed, an adhesive agent layer provided on the rear face of the print medium and a separation layer covering the adhesive agent layer, the printing apparatus further comprising a cutting device that cuts the recording object medium so as to produce a label, the cutting device being provided at a place to which the recording object medium on which the print data is printed is to be discharged.

5. A format edit program recorded in a non-transitory computer-readable recording medium, the format edit program comprising:
   a format selection step of selecting any one format from among formats stored preliminarily, the formats being constituted of plural blocks for forming a data input area specified for each recording object medium and defining an edit sequence of the plural blocks so as to input data into the data input area;
   a block edit sequence changing step of changing the edit sequence of the plural blocks defined by the format for the format selected in the format selection step;
   a printing step of printing a print data produced based on the format on the recording object medium;
   a print information input step of inputting print information of an image or character into each of the plural blocks along the edit sequence of the plural blocks defined by a format selected in the format selection step, wherein the block edit sequence changing step changes the edit sequence of the plural blocks based on whether or not the print information is input in the print information input step; and
   a block input setting table memory step of storing a block input setting table in which whether or not the print information is input into each of the plural blocks in the print information input step is set, wherein the block edit sequence changing step changes the edit sequence of the plural blocks so that a block in which the print information is input comes first while a block in which no print information is input comes after, based on the block input setting table.

6. The format edit program according to claim 5 further comprising a block edit sequence specifying step of specifying the edit sequence of the plural blocks wherein the block edit sequence changing step changes the edit sequence of the plural blocks based on the edit sequence specified in the block edit sequence specifying step.

7. The format edit program according to claim 6 further comprising a block identification information display step of displaying pieces of block identification information for identifying each of the plural blocks such that they are capable of being selected, wherein
   the block edit sequence specifying step specifies plural pieces of block identification information displayed in the block identification information display step in an arbitrary order and the block edit sequence changing step changes the edit sequence of the plural blocks based on a selection order of the plural pieces of block identification information specified in the block edit sequence specifying step.

8. The format edit program according to claim 5 further comprising a cutting step of cutting the recording object medium so as to produce a label on which the print data printed in the printing step is printed on the part of the recording object medium to be discharged.

* * * * *